(12) United States Patent
Minesawa et al.

(10) Patent No.: US 11,025,157 B2
(45) Date of Patent: Jun. 1, 2021

(54) CONTROL CIRCUIT, ELECTRIC DRIVING SYSTEM, INVERTER SYSTEM AND METHOD FOR CONTROLLING THEREOF

(71) Applicant: RENESAS ELECTRONICS CORPORATION, Tokyo (JP)

(72) Inventors: Ryutaro Minesawa, Tokyo (JP); Chengzhe Li, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/682,908

(22) Filed: Nov. 13, 2019

(65) Prior Publication Data

US 2020/0204061 A1    Jun. 25, 2020

(30) Foreign Application Priority Data

Dec. 20, 2018  (JP) .............................. JP2018-238768

(51) Int. Cl.
  *H02M 1/32*   (2007.01)
  *G01K 7/01*   (2006.01)
  *H02M 7/537*   (2006.01)

(52) U.S. Cl.
  CPC ................ *H02M 1/32* (2013.01); *G01K 7/01* (2013.01); *H02M 7/537* (2013.01); *H02M 2001/327* (2013.01)

(58) Field of Classification Search
  CPC .................... H02M 2001/327; H02M 7/42–64
  See application file for complete search history.

(56) References Cited

U.S. PATENT DOCUMENTS

| 5,712,802 | A | * | 1/1998 | Kumar | ............... | G05D 23/1917 |
| | | | | | | 257/712 |
| 6,111,767 | A | * | 8/2000 | Handleman | ............. | H02J 3/381 |
| | | | | | | 363/95 |
| 10,175,275 | B2 | | 1/2019 | Tsurumaru | | |
| 2005/0204761 | A1 | * | 9/2005 | Karikomi | ............... | G01K 7/425 |
| | | | | | | 62/228.1 |
| 2007/0252548 | A1 | * | 11/2007 | Moon | ..................... | H02P 29/68 |
| | | | | | | 318/434 |
| 2012/0217795 | A1 | * | 8/2012 | Hasegawa | ............... | H02M 7/48 |
| | | | | | | 307/9.1 |
| 2015/0008858 | A1 | * | 1/2015 | Oh | ........................ | H02P 29/662 |
| | | | | | | 318/490 |

FOREIGN PATENT DOCUMENTS

JP     2017-003342 A     1/2017

* cited by examiner

*Primary Examiner* — Thienvu V Tran
*Assistant Examiner* — Peter M Novak
(74) *Attorney, Agent, or Firm* — McDermott Will & Emery LLP

(57) ABSTRACT

The temperature of inverters and power semiconductor devices is detected at high speed and with high accuracy. The electronic control circuit includes a vector instruction circuit for calculating an efficiency value of an inverter corresponding to a torque instruction value, and a temperature estimation circuit for estimating a temperature of the power semiconductor element based on the efficiency value of the inverter and a duty cycle for driving the power semiconductor element constituting the inverter.

16 Claims, 15 Drawing Sheets

FIG. 8

| Torque Map at REV=950[rpm], VBUS=300[V] | | | |
|---|---|---|---|
| Torque[Nm] | Id [A] | Iq [A] | Efficiency [%] |
| -108.0 | -142.03 | -246.00 | 108.4 |
| -81.0 | -88.06 | -197.79 | 108.1 |
| -54.0 | -50.95 | -139.97 | 107.9 |
| -27.0 | -19.59 | -73.11 | 107.3 |
| 0.0 | 0.00 | 0.00 | 0.0 |
| 27.0 | -29.62 | 81.38 | 93.6 |
| 54.0 | -66.98 | 143.63 | 94.0 |
| 81.0 | -113.45 | 196.50 | 93.7 |
| 108.0 | -160.37 | 246.95 | 93.5 |

CONTROL CIRCUIT, ELECTRIC DRIVING SYSTEM, INVERTER SYSTEM AND METHOD FOR CONTROLLING THEREOF

CROSS-REFERENCE TO RELATED APPLICATIONS

The disclosure of Japanese Patent Application No. 2018-238768 filed on Dec. 20, 2018 including the specification, drawings and abstract is incorporated herein by reference in its entirety.

BACKGROUND

The motor (prime mover) is used as a power source of an electric vehicle (EV) or a hybrid electric vehicle (HEV). When driving an electric motor, an inverter (power converter) that performs DC-AC conversion is used in order to obtain a predetermined driving torque and driving frequency.

Inverters have been proposed in various circuit configurations and control methods for driving electric motors. For example, the inverter described in Japanese unexamined patent publication No. 2017-3342 includes a power module for switching voltage application to a motor, a driver IC for driving the power module, and a control circuit for outputting a control signal to the driver IC.

SUMMARY

Since the inverter performs switching of the high-voltage power supply by the built-in power semiconductor device, heat is generated in operation. When heat generation is accumulated, the power semiconductor device or the inverter may be damaged or ignited, and therefore, temperature management for preventing overheating is necessary. It is an object of the present disclosure to provide a technique for preventing overheating of a power semiconductor element and an inverter.

Other objects and novel features will become apparent from the description of the present specification and the accompanying drawings.

The typical aspects of the present disclosure will be briefly described below. That is, the driving system according to the embodiment acquires the efficiency value of the inverter corresponding to the torque instruction value, and calculates the loss of the entire inverter based on the efficiency value. Subsequently, based on the duty cycle (duty ratio) for driving each power semiconductor element, calculation for distributing the breakdown of the loss of the entire inverter is performed for each of the power semiconductor elements constituting the inverter, thereby obtaining the loss of each power semiconductor element. Next, the temperature of the power semiconductor element is calculated by calculation based on the loss of each power semiconductor element and a known thermal resistance value.

The driving system according to another embodiment estimates the virtual temperature of the power semiconductor element in the virtual driving condition while estimating the temperature of the power semiconductor element in the condition that the inverter is being driven. In addition, the maximum allowable torque value at which the inverter does not become overheated can be calculated to limit the output torque.

By using the transient thermal resistance of the power semiconductor device for temperature estimation, the driving system according to another embodiment can estimate the temperature of the power semiconductor device when a certain time elapses after the motor is continuously driven by a certain torque.

According to the driving system and the control method thereof, the temperature of the inverter and the power semiconductor element can be detected at high speed and with high accuracy.

BRIEF DESCRIPTION OF THE DRAWINGS

FIG. 8 is a list showing an example of the torque map according to the first embodiment.

DETAILED DESCRIPTION

Figure 1:
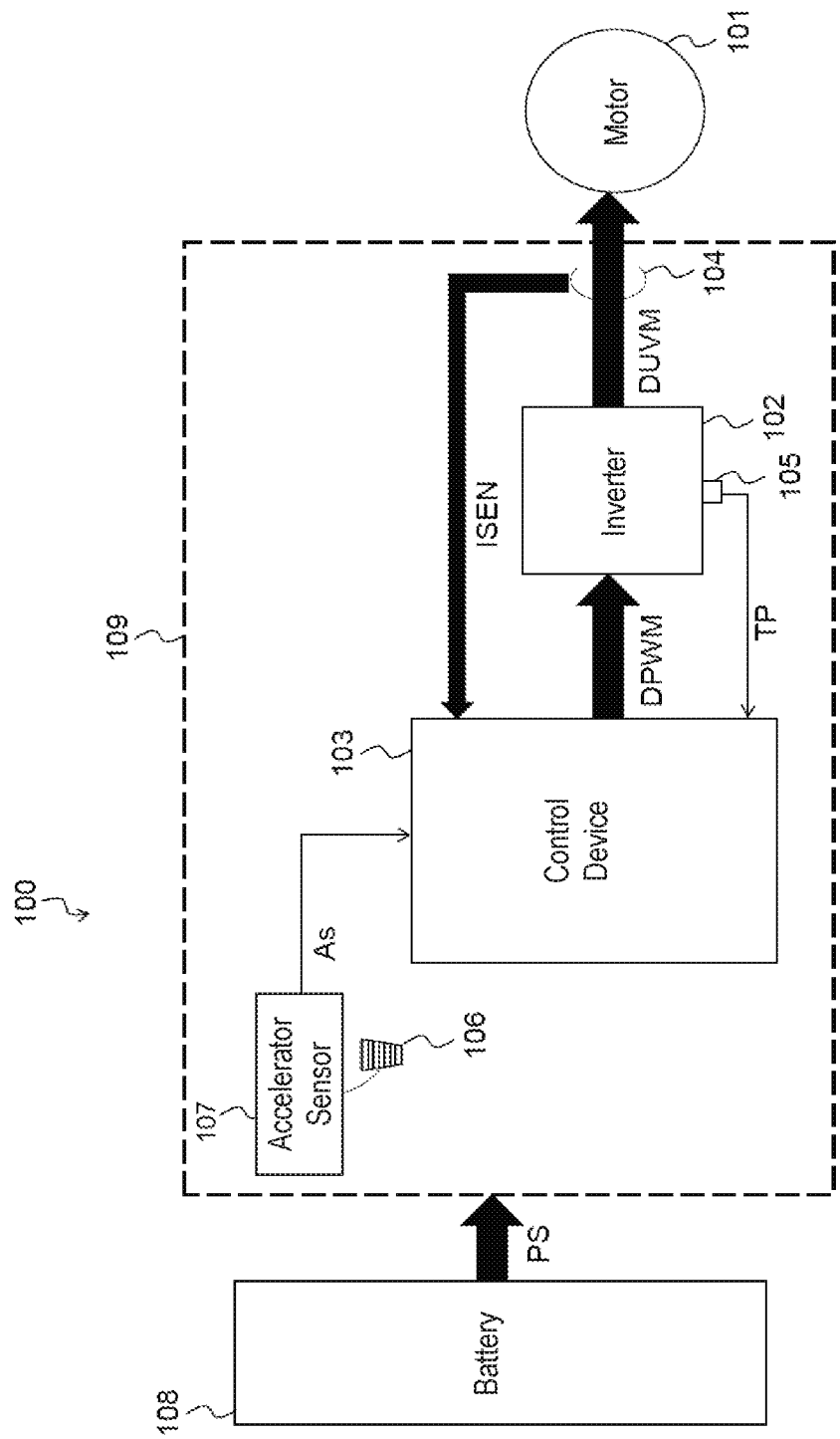
FIG. 1 is a block diagram showing a configuration example of a drive system of an electric vehicle (EV) according to a first embodiment.

Embodiments and examples will be described below with reference to the drawings. In the specification and the drawings, the same or corresponding components are denoted by the same reference numerals, and a repetitive description thereof may be omitted. In the drawings, for convenience of description, the configuration may be omitted or simplified. In addition, at least some of the embodiments and each modification may be arbitrarily combined with each other.

Embodiment 1

(Example of Configuration of Drive System)

FIG. 1 is a block diagram showing a configuration example of a drive system 100 of an electric vehicle according to a first embodiment. The drive system 100 uses an electric motor 101 as a power source. The motor 101 is driven by an inverter (power converter) 102 that performs DC-AC conversion in order to obtain a predetermined driving torque and driving frequency.

The inverter 102 has a function of switching and controlling the voltage applied to the motor 101, and is controlled by the control device 103. The controller 103 outputs the six-channel gate drive signals DPWM to the inverters 102. The inverter 102 flows current to the motor 101 and drives the motor 101 by applying a 6-channel drive voltage DUVM to the motor 101. The current flowing through the motor 101 is detected by a current detector 104 and inputted to the control circuitry as a six-channel current ISEN. In addition, in order to detect overheating of the inverter 102, the control device 103 inputs a temperature measurement value TP from a temperature sensor 105 incorporated in the inverter 102.

The inverter 102 is covered with a water jacket formed with a cooling water passage for circulating the cooling water, and uses a cooling system for propagating heat generated by the inverter 102 to the cooling water. The temperature sensor 105 measures the water temperature at an arbitrary position in the water jacket. When the inverter 102 is contacted with a heat sink and a cooling system is employed in which heat is discharged using heat radiation of the heat sink, the temperature sensor 105 measures the temperature of an arbitrary portion of the heat sink. In any of the measurement methods, it is desirable to dispose the temperature sensor 105 in the vicinity of the mounting portion of the power semiconductor elements 102a to 102f as the heat source.

When instructing the vehicle to accelerate, the driver presses the accelerator pedal 106. The accelerator pedal 106 is connected to an accelerator sensor 107. The accelerator sensor 107 converts the amount of depression of the accelerator pedal 106 into an electric signal, and outputs the electric signal as an accelerator instruction value (factor) As to the control device 103.

The battery 108 is a power source PS for each element of the electrical control system 109 of the drive system 100. A plurality of output voltages of the battery 108 are boosted or stepped down as necessary, and supplied as a power source of each element.

Figure 2:
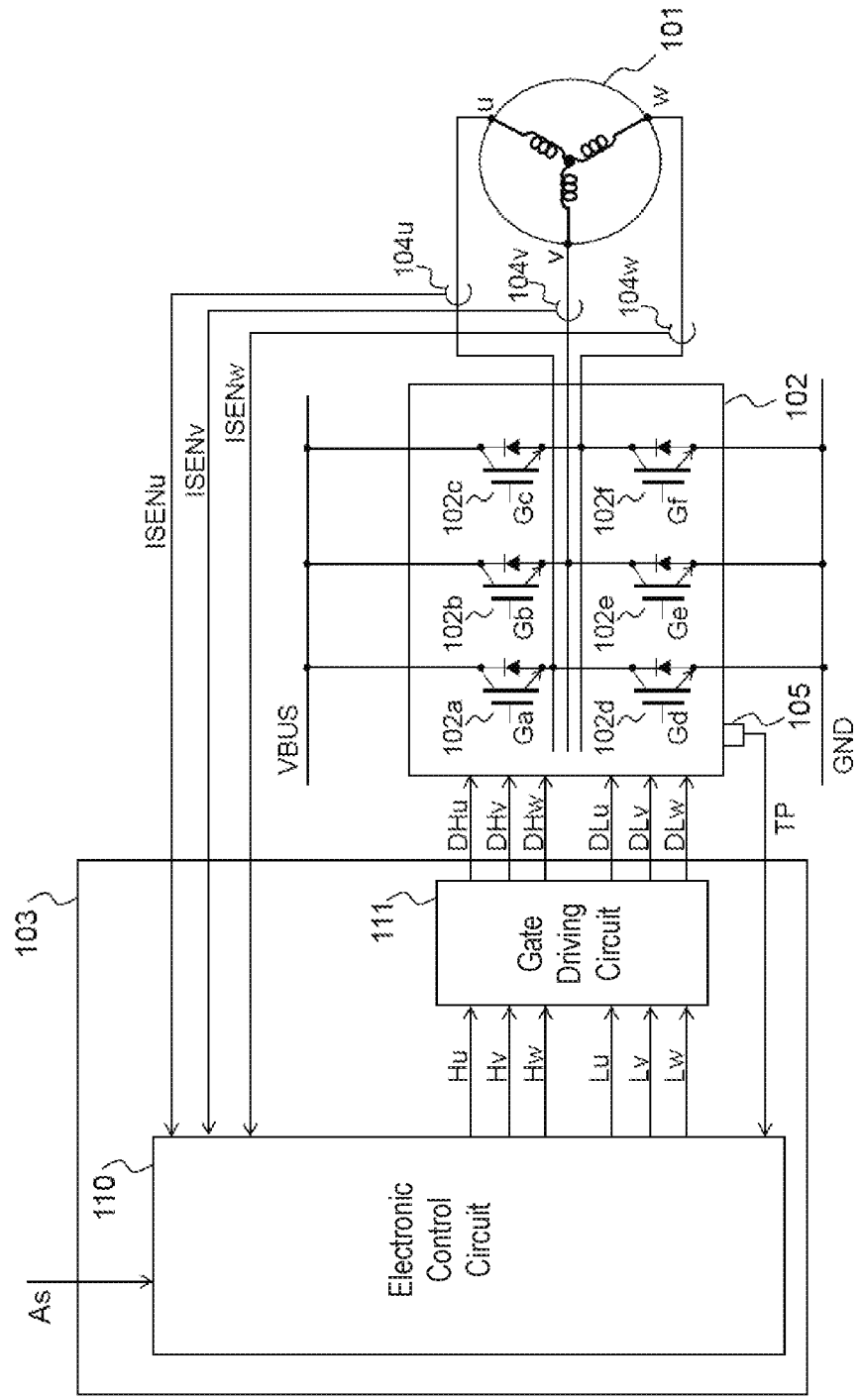
FIG. 2 is a block diagram showing an example of the configuration of the main part of the drive system firstly considered by the inventor.

FIG. 2 shows an example of a main configuration of the drive system 100 first considered by the inventor. The motor 101 is a three-phase motor having three-phase (u, v, w) load drive terminals OUT(u, v, w). Inverters 102 include power semiconductor devices 102a to 102f composed of insulated gate bipolar transistors (IGBTs) and fast recovery diodes (FRDs) or freewheel diodes (FWDs). The power semiconductor devices 102a to 102c are provided between the power supply voltages VBUS and the respective phases of the load driving terminals OUT (u, v, w). The power semiconductors 102d to 102f are provided between the respective phases of the load drive terminals OUT (u, v, w) and the ground power supply voltage GND. The inverter 102 also includes a temperature sensor 105 for measuring the temperature of the inverter 102.

The power semiconductors 102a to 102f may be MOSFETs (Metal Oxide Semiconductor Field Effect Transistors) of Si, SiC, GaN, or other materials, or may be power devices or transistors of other structures, or other electronic or electric switching means. The temperature sensor 105 is configured by, for example, a thermistor showing an electric resistance value corresponding to a temperature, but may be another temperature detecting element or a temperature detecting device capable of electrically detecting a temperature.

The control device 103 includes an electronic control circuit 110 and a gate driving circuit 111. The electronic control circuit generates a PWM signal for driving the gates of the power semiconductor devices 102a to 102f based on the accelerator instruction value As input from the accelerator sensor 107. The control circuit 103 includes, for example, a MCU (Micro Controller Unit) with a processor, and at least a part of the functions of the control circuit 103 is implemented by a programming process using the processor. The configuration and function of the control circuit 103 may be realized by a combination of a plurality of semiconductor devices, other electric circuits, electronic circuits, and mechanical components.

The electronic control circuit 110 receives the measured current values ISEN (ISENu, ISENv, ISENw) detected by the Hall elements 104u, 104v, and 104w constituting the current detector 104, and recognizes the current flowing through the motor 101. Then, a complementary three-phase voltage signal PWMH (Hu, Hv, Hw) and PWML (Lu, Lv, Lw) for controlling the on/off of the gates of the power semiconductor devices 102a to 102f are generated and output to the gate drive circuits 111 so that a desired current flows to the motor 101.

The gate driving circuit 111 is provided between the control circuit 103 and the inverter 102. The gate driving circuit 111 outputs gate driving signals DPWMH (DHu, DHv, DHw) and DPWML (DLu, DLv, DLw) for driving the gates of the power semiconductor devices 102a to 102f based on the three-phase voltage signals PWMH (Hu, Hv, Hw) and PWML (Lu, Lv, Lw).

The gate Ga of the power semiconductor device 102a is driven by the gate drive signal DHu. The gate Gb of the power semiconductor device 102b is driven by the gate driving signal DHv. The gate Gc of the power semiconductor device 102c is driven by the gate drive signal DHw. The gate Gd of the power semiconductor device 102d is driven by the gate drive signal DLu. The gate Ge of the power semiconductor device 102e is driven by the gate drive signal DLv. The gate Gf of the power semiconductor device 102f is driven by the gate drive signal DLw.

(Explanation of Temperature Control)

The motor 101 of an electric vehicle may require an output of several 10 to several 100 kW to drive the vehicle. Therefore, a current of several hundred amperes or more may flow through the inverter 102 that switches the power supply to the motor 101. Under such current conditions, the inverter 102 generates heat due to its internal resistance. If the operation is continued in a state in which the inverter 102 is overheated, failure or ignition may occur. In order to prevent such a situation, the inverter 102 is provided with the temperature sensor 105 to measure the temperature, and outputs the measured temperature value TP to the electronic control circuit 110. The electronic control circuit 110 has a function of protecting against overheating of the inverter, and when overheating of the inverter is detected, the electronic control circuit 110 performs control so as to lower or stop the output of the motor.

(Consideration by the Inventor)

As a result of the inventor's examination of the drive system of FIG. 2, the following examination points have been found regarding the internal structure or function of the electronic control circuit 110. That is, the cause of the heat generation of the inverter is that the heat generation of the power semiconductor elements 102a to 102f for switching the power supply to the motor 101 is dominant, and the temperature sensor 105 provided in the inverter cannot directly measure the temperature of the power semiconductor elements 102a to 102f. Therefore, the temperature measurement value TP has a large error with respect to the actual temperature of the power semiconductor element, and has a large time difference until the actual temperature rise is reflected in the temperature measurement value TP. Therefore, it is impossible to accurately and quickly detect that any of the power semiconductor elements 102a to 102f is in an overheated state. If the electronic control circuit 110 cannot detect the overheated state and the operation of the inverter 102 is continued, the inverter 102, the power semiconductor elements 102a to 102f, or the motor 101 may be damaged or ignited.

Figure 3:
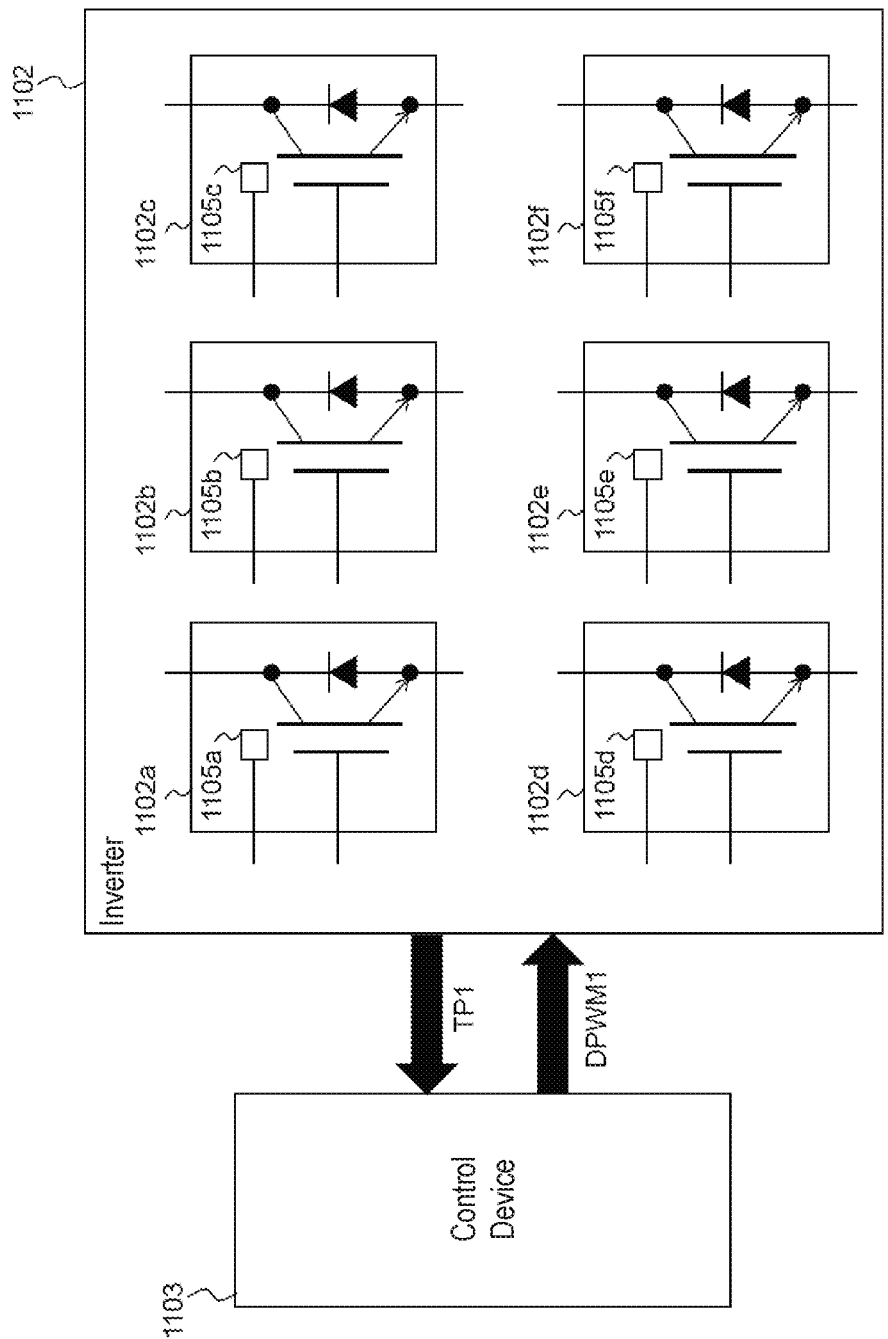
FIG. 3 is a block diagram showing an example of the configuration of the drive system secondly considered by the inventor.

The inventor further examined the configuration of FIG. 3. FIG. 3 shows an example of a configuration in which a temperature sensor is disposed in a portion closer to a power semiconductor element which is a heat source. Inverter 1102 of FIG. 3 includes power semiconductor devices 1102a to 1102f. On the chips of the power semiconductor devices 1102a to 1102f, temperature sensors 1105a to 1105f composed of devices having voltage characteristics dependent on temperature, such as polysilicon or a diode, are mounted in combination for temperature measurement. In this study, the control device 1103 has a function of detecting the temperature of each of the power semiconductor elements 1102a to 1102f by inputting the temperature measurement values TP1 of the six channels by the temperature sensors 1105a to 1105f, in addition to a function of outputting the gate driving signals DPWM1 of the six channels for driving the gates of the power semiconductor elements 1102a to 1102f.

However, in the examination example of FIG. 3, since the temperature sensors 1105a to 1105f are mounted on the chips of the power semiconductor devices 1102a to 1102f in combination, the size of the chips increases and the circuit becomes large. In the case of configuring the circuit of the inverter 1102, the addition of wiring and devices for the control device 1103 to detect the temperatures of the six power semiconductor elements is also required, which is a factor for increasing the size of the circuit. For a vehicle system in which hundreds of modules have to be mounted in a limited mounting space, an increase in the size of a circuit is unacceptable.

Figure 4:
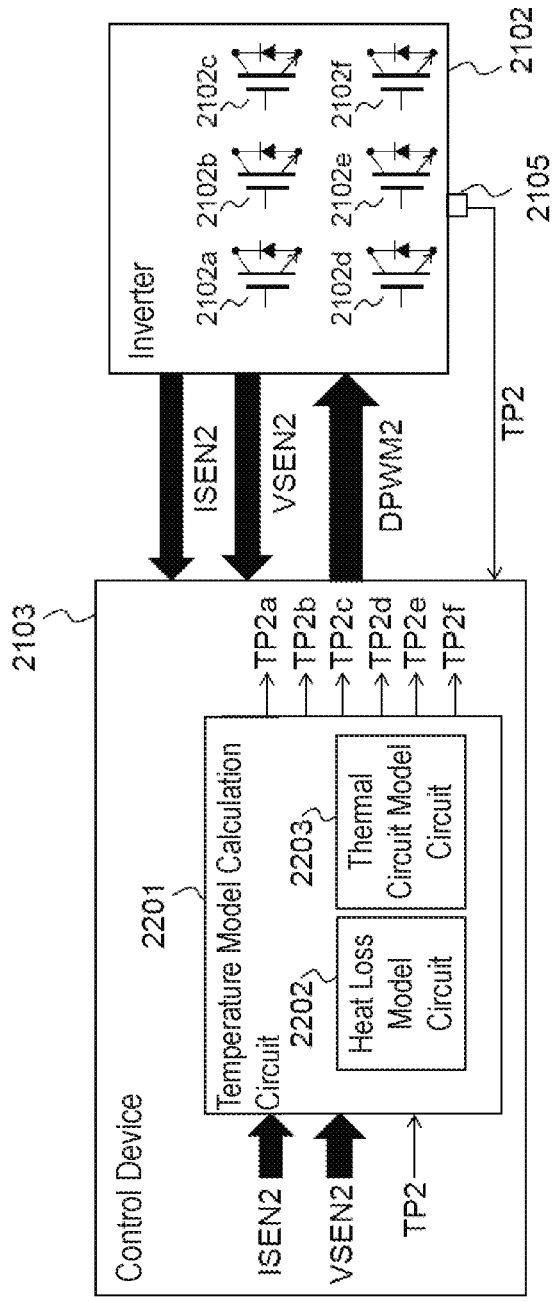
FIG. 4 is a block diagram showing an example of the configuration of the drive system thirdly considered by the inventor.

The inventor further examined the configuration of FIG. 4. Inverter 2102 of FIG. 4 includes an element or circuit capable of measuring the current and voltage of each of power semiconductor elements 2102a to 2102f. The control device 2103 outputs the six-channel gate drive signals DPWM2 to the inverter 2102, and inputs the six-channel current measured value ISEN2 and the six-channel detected voltage value VSEN2 from the inverter 2102 at the same time. In addition, the temperature sensor 2105 inputs a temperature measurement TP2. The control device 2103 further includes a temperature model calculation circuit 2201 for estimating the temperatures of the power semiconductor elements 2102a to 2102f. The temperature model calculation circuit 2201 includes a heat loss model circuit 2202 for holding the amounts of heat loss corresponding to the combinations of the measured values ISEN2 and the measured values VSEN2 of the six channels flowing through the power semiconductor elements 2102a to 2102f, and a thermal circuit model circuit 2203 for expressing the heat sources and the heat dissipation paths of the inverters 2102 by equivalent circuits.

With the above-described configuration, the temperature model calculation circuit 2201 can calculate the temperature estimation values TP2a to TP2f of the power semiconductor elements 2102a to 2102f by calculation based on the temperature measurement values TP2, the six-channel current measurement ISEN2, and the six-channel voltage measurement VSEN2.

However, since the estimation processing in the examination example of FIG. 4 involves complicated calculations, for example, when the temperature model calculation circuit 2201 is configured by the MCU, there is a possibility that it occupies the processing capacity of the MCU and hinders the progress of other processing such as motor control and protective processing.

The inventors have also found a problem common to FIG. 3 and FIG. 4. That is, since the temperature is estimated based on the measured value of the current and the measured value of the voltage of the inverter, it is impossible to estimate the amount of heat generated when it is assumed that the motor is driven by an arbitrary torque.

The drive system 100 according to the first embodiment is configured on the basis of the analysis of the above-mentioned examination example.

(Detailed Configuration Example of the Electronic Control Circuit 110 According to Embodiment 1)

Figure 5:
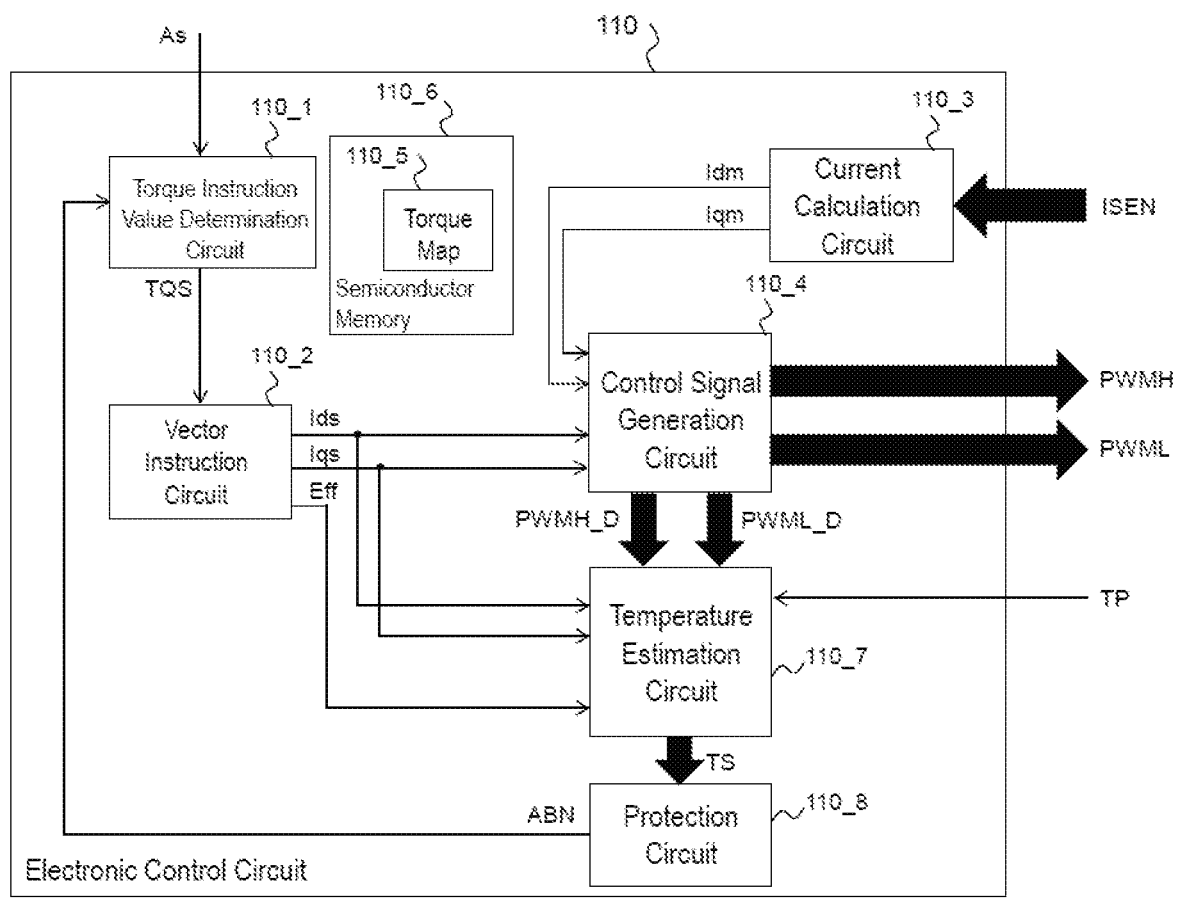
FIG. 5 is a block diagram showing a detailed configuration example of the electronic control circuit according to the first embodiment.

FIG. 5 is a block diagram showing an example of a detailed configuration of the electronic control circuit 110 according to the first embodiment. Unless otherwise specified, the description of the same reference numerals as in FIG. 2 shall apply mutatis mutandis to the description of FIG. 2.

The torque instruction value determination circuit 110_1 in the electronic control circuit 110 calculates and outputs a torque instruction value (factor) TQS indicating the magnitude of the torque as the drive amount to be output by the motor 101, based on the accelerator instruction value (factor) As.

The vector instruction circuit 110_2 outputs a current value to be supplied to the motor 101 in order to output a desired torque based on the torque instruction value TQS input from the torque instruction value determination circuit 110_1. The current instruction value to be flowed to the motor 101 is given by two values of a d-axis current instruction value Ids and a q-axis current instruction value Iqs as a current vector based on the d-q coordinate system. That is, the value of the current to be flowed to the motor is expressed by the d-axis current instruction value Ids and the q-axis current instruction value Iqs in the d-q coordinate system, which is composed of the d-axis in the magnetic flux direction formed by the magnets of the rotor of the motor 101 and the q-axis direction perpendicular to the d-axis, and which rotates together with the rotor. That is, the vector instruction circuit 110_2 acquires or calculates and outputs a current vector composed of the d-axis current instruction value Ids and the q-axis current instruction value Iqs.

In addition, the vector instruction circuit 110_2 outputs the inverter efficiency value Eff when the inverter 101 is driven by the d-axis current instruction value Ids and the q-axis current instruction value Iqs.

The current calculation circuit 110_3 acquires the three-phase current measurement value ISEN (ISENu, ISENv, ISENw) of the motor 101 from the current measurement circuit 104u, 104v, 104w configured by current detection elements such as Hall elements. Based on the acquired three-phase current measurement value ISEN (ISENu, ISENv, ISENw), a current vector composed of the d-axis current measurement value Idm and the q-axis current measurement value Iqm is calculated by a coordinate transformation or the like.

The control signal generating circuit 110_4 receives the d-axis current measurement value Idm, the q-axis current measurement value Iqm, the d-axis current instruction value Ids, and the q-axis current instruction value Iqs. Further, the control signal generating circuit 110_4 performs PI (proportional integration) control so that the d-axis current measurement value I dm and the q-axis current measurement value Iqm converge to the d-axis current instruction value Ids and the q-axis current instruction value Iqs, respectively, and calculates the d-axis voltage instruction value Vds and the q-axis voltage instruction value Vqs.

Subsequently, the control signal generating circuit 110_4 calculates the duty cycles PWMH_D (Hu_D, Hv_D, Hw_D) and PWML_D (Lu_D, Lv_D, Lw_D) for driving the six power semiconductor elements 102a to 102f based on the d-axis voltage instruction value Vds and the q-axis voltage instruction value Vqs by calculation such as coordinate transformation.

Further, on the basis of the duty cycles PWMH_D (Hu_D, Hv_D, Hw_D) and PWML_D (Lu_D, Lv_D, Lw_D), complementary three-phase voltage signals PWMH (Hu, Hv, Hw) and PWML (Lu, Lv, Lw) are generated as gate control signals for driving the six power semiconductor elements 102a to 102f by PWM modulation or other calculation. The three-phase voltage signals PWMH (Hu, Hv, Hw) and PWML (Lu, Lv, Lw) are PWM signals complementary to each other, therefore Lu is at a low level at a time when Hu is at a high level, for example.

However, strictly speaking, dead time for simultaneously deactivating the power semiconductor elements 102a and 102b is included in order to prevent wiring shorts due to simultaneous activation of the power semiconductor elements 102a and 102b. Complementary three-phase voltage signals PWMH(Hu, Hv, Hw) and PWML (Lu, Lv, Lw) are outputted to the gate driving circuit 111, respectively, and become the generation sources of the gate driving signals DPWMH (DHu, DHv, DHw) and DPWML (DLu, DLv, DLw) in the gate driving circuit 111.

Here, the control signal generator 110_4 holds the duty cycles PWMH_D (Hu_D, Hv_D, Hw_D) and PWML_D (Lu_D, Lv_D, Lw_D) of the complementary three-phase voltage signals PWMH (Hu, Hv, Hw) and PWML (Lu, Lv, Lw) which are PWM signals.

The current calculation circuit 110_3 calculates the motor rotational speed REV per unit time based on the periodicity of the temporal change of the three-phase current measured value ISEN (ISENu, ISENv, ISENw). The rotation speed REV can be calculated based on the measured current value as described above, or can also be calculated based on the output of a motor rotation detecting device such as a resolver.

In the torque map 110_5, the d-axis current instruction value Ids and the q-axis current instruction value Iqs corresponding to the torque instruction value at a specific rotational speed REV and a specific motor drive voltage VBUS, and the inverter efficiency value Eff when the inverter 101 is driven under these current conditions are recorded. The inverter efficiency value Eff is a ratio of the power output from the inverter 101 to the power input to the inverter 101. In other words, it is the ratio of the output power of the inverter 101 to the input power of the inverter 101.

The torque map 110_5 is held in, for example, the semiconductor memory 110_6 in the electronic control circuit 110. As the semiconductor memory 110_6, for example, a volatile or nonvolatile memory device can be used. The semiconductor memory 110_6 may be disposed outside the electronic control circuit 110. The temperature estimation circuit 110_7 estimates the temperatures TS (TSa, TSb, TSc, TSd, TSe, TSf) of the power semiconductor elements 102a to 102f based on the duty cycles PWMH_D (Hu_D, Hv_D, Hw_D), PWML_D (Lu_D, Lv_D, Lw_D), d-axis current instruction value Ids, q-axis current instruction value Iqs, d-axis voltage instruction value Vds, q-axis voltage instruction value Vqs, temperature measurement value TP, and inverter efficiency value Eff of each of the complementary three-phase voltage signals.

(Temperature Estimation Method)

The temperature estimation circuit 110_7 calculates the inverter output power Pout and the input power Pin from the d-axis current instruction value Ids, the q-axis current instruction value Iqs, the d-axis voltage instruction value Vds, the q-axis voltage instruction value Vqs and the inverter efficiency value Eff. The calculation equations for calculating the inverter output power Pout and the input power Pin are expressed by the following equations (1) and (2), respectively.

[Equation 1]

$$P_{out}=I_{ds} \times V_{ds}+I_{qs} \times V_{qs} \quad (1)$$

[Equation 2]

$$P_{in}=P_{out}/\text{Eff} \quad (2)$$

The inverter output voltage Pout can also be calculated from the phase current and the phase voltage of the three phases based on the power factor of the inverter output voltage.

Next, the temperature estimation circuit 110_7 calculates the loss ILOSS of the inverter 102 from the inverter output power P out and the input power Pin. An arithmetic expression for calculating the lossy ILOSS of the inverters 102 is expressed by Equation (3) below.

[Equation 3]

$$ILOSS=P_{in}-P_{out} \quad (3)$$

Since the loss ILOSS of the inverter 102 is mainly consumed as heat, the loss ILOSS of the inverter 102 substantially corresponds to the calorific value of the inverter 102. Further, since the loss ILOSS of the inverter 102 is mainly composed of the total loss SLOSS of the power semiconductor elements 102a to 102f, the heat generation quantity of the inverter 102 substantially corresponds to the total loss SLOSS of the power semiconductor elements 102a to 102f. Here, when a loss other than the loss of the power semiconductor elements 102a to 102f in the loss ILOSS of the inverters 102 is taken as OLOSS, an arithmetic expression for calculating the total loss SLOSS of the power semiconductor elements 102a to 102f is expressed by the following equation (4).

[Equation 4]

$$SLOSS=ILOSS-OLOSS \quad (4)$$

Further, the temperature estimation circuit 110_7 calculates the individual losses SLOSSa to SLOSSf of the power semiconductor devices 102a to 102f by distributing the total loss SLOSS of the power semiconductor devices 102a to 102f based on the number of power semiconductor devices and the duty cycle of the signals for driving the gates of the power semiconductor devices. Since the duty cycles of the signals for driving the gates of the power semiconductor elements 102a to 102f are given by PWMH_D (Hu_D, Hv_D, Hw_D) and PWML_D (Lu_D, Lv_D, Lw_D), the calculation equation for calculating the individual losses SLOSSa to SLOSSf is as follows. Here, Ch is the number of channels of the inverter, and Ch=6 in the present embodiment.

[Equation 5]

$$\begin{pmatrix} SLOSS_a \\ SLOSS_b \\ SLOSS_c \\ SLOSS_d \\ SLOSS_e \\ SLOSS_f \end{pmatrix} = \frac{S_{LOSS}}{Ch} \times \begin{pmatrix} Hu\_D \\ Hv\_D \\ Hw\_D \\ Lu\_D \\ Lv\_D \\ Lw\_D \end{pmatrix} \quad (5)$$

The amount of temperature increase of the power semiconductor element is determined based on the loss and the thermal resistance of the power semiconductor element. The thermal resistance is the ratio of the amount of temperature rise to the amount of heat generated, and the unit is [degrees Celsius per watt]. In the present embodiment, the thermal resistances for calculating the temperatures of the junction portions of the power semiconductor elements 102a to 102f are set equal to Rth. The temperature estimation circuit 110_7 calculates the temperatures TSa to TSf of the power semiconductor elements 102a to 102f by the calculation represented by the following equation (6).

[Equation 6]

$$\begin{pmatrix} TS_a \\ TS_b \\ TS_c \\ TS_d \\ TS_e \\ TS_f \end{pmatrix} = Rth \times \begin{pmatrix} SLOSS_a \\ SLOSS_b \\ SLOSS_c \\ SLOSS_d \\ SLOSS_e \\ SLOSS_f \end{pmatrix} + TP \quad (6)$$

The thermal resistance Rth of the power semiconductor elements 102a to 102f is known by measurement or simulation, and the value is held in the electronic control unit 110. As a holding method, for example, the data can be stored in the semiconductor memory 110_6. The thermal resistance Rth of the power semiconductor elements 102a to 102f can also be calculated in the electronic control circuit 110 by calculation.

In the calculation of the present embodiment, the loss ILOSS of the inverter 102 is calculated to coincide with the total loss SLOSS of the power semiconductor elements 102a to 102f, but the loss of other components constituting the inverter, such as a film capacitor, a bus bar, and a discharging resistor, can also be included in the calculation. In this instance, the total loss SLOSS of the power semiconductor elements 102a to 102f may be obtained by subtracting the loss of other components from the loss ILOSS of the inverters 102.

In the calculation of the present embodiment, the thermal resistances of the power semiconductor elements 102a to 102f are set equal to Rth, but by acquiring the individual thermal resistances Rtha to Rthf of the power semiconductor elements 102a to 102f in advance, the calculation can be performed in consideration of the difference in the thermal resistances of the power semiconductor elements 102a to 102f caused by the condition for mounting the power semiconductor elements 102a to 102f on the drive system 100. When the temperatures TSa to TSf of the power semiconductor elements 102a to 102f are calculated by using the individual thermal resistances Rtha to Rthf, a calculation formula expressed by the following formula (7) is used.

[Equation 7]

$$\begin{pmatrix} TS_a \\ TS_b \\ TS_c \\ TS_d \\ TS_e \\ TS_f \end{pmatrix} = \begin{pmatrix} Rth_a \times SLOSS_a \\ Rth_b \times SLOSS_b \\ Rth_c \times SLOSS_c \\ Rth_d \times SLOSS_d \\ Rth_e \times SLOSS_e \\ Rth_f \times SLOSS_f \end{pmatrix} + TP \quad (7)$$

(Protecting Operations)

The temperature estimation circuit 110_7 outputs the calculated temperatures TS (TSa, TSb, TSc, TSd, TSe, TSf) of the power semiconductor elements 102a to 102f to the protection circuit 110_8.

The protection circuit 110_8 inputs the temperature TSA to TSf of the power semiconductor devices 102a to 102f, and controls the control device 103 so that when it is determined that any power semiconductor device is in an overheated state, the drive of the power semiconductor device in an overheated state is stopped and the device quickly returns to the normal state (non-overheated state). Hereinafter, a specific configuration example for realizing the control method will be described.

In the present embodiment, the protection circuit 110_8 holds the overheat temperature threshold Tth. The overheat temperature threshold value Tth indicates a reference temperature at which the power semiconductor element is determined to be in an overheated state, and is set to, for example, 80 degrees Celsius. The protection circuit 110_8 compares each of the temperatures TSa to TSf of the power semiconductor elements 102a to 102f with the overheat temperature threshold Tth. If either of the Tsa to TSf exceeds Tth, the protection circuit 110_8 outputs an abnormal signal ABN indicating that the inverter 102 is in an overheated state to the torque instruction value determination circuit 110_1. When the abnormal signal ABN is received, the torque instruction value determination circuit 110_1 outputs a zero value as the torque instruction value TQS in order to stop driving the motor 101. Specifically, the torque map 110_5 is referred to, and the current instruction values Ids=0 [A] and Iqs=0 [A] at TQS=0 [Nm] are outputted. As a result, no current flows through all of the power semiconductor elements 102a to 102f, and the power semiconductor elements in the overheated state are cooled.

Figure 6:
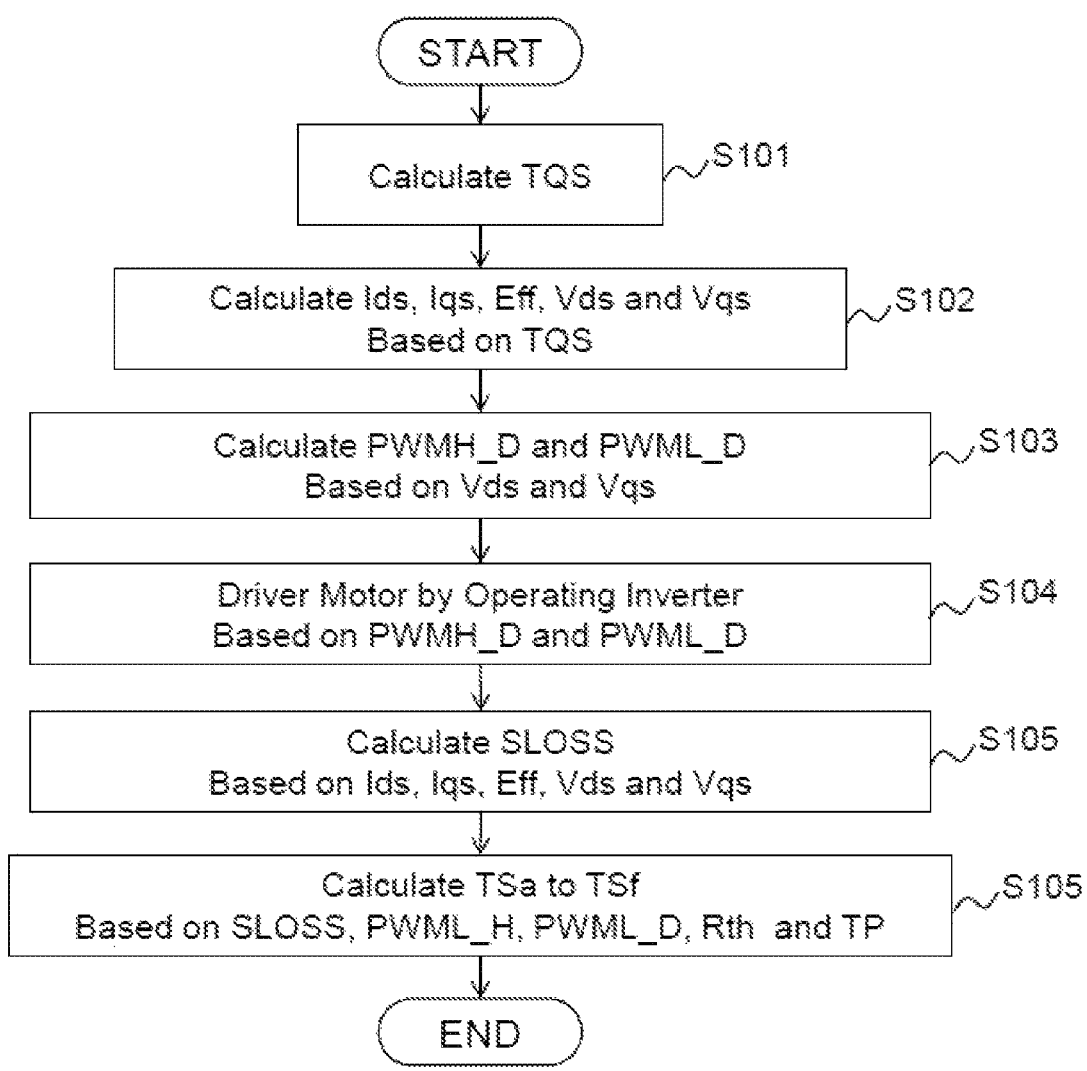
FIG. 6 is a flowchart showing an example of the operation of the drive system according to the first embodiment.

An example of an operation flow of the driving system 100 according to the present embodiment will be described with reference to FIG. 6. First, the torque instruction value TQS corresponding to the accelerator instruction value As is calculated (step S101). Next, the calculated torque instruction value TQS is used to calculate the d-axis current instruction value Ids, the q-axis current instruction value Iqs, the inverter efficiency value Eff, the d-axis voltage instruction value Vds, and the q-axis voltage instruction value Vqs (step S102). Next, based on the d-axis voltage instruction value Vds and the q-axis voltage instruction value Vqs, the duty cycles PWMH_D (Hu_D, Hv_D, Hw_D) and PWML_D (Lu_D, Lv_D, Lw_D) for driving the six power semiconductors 102a to 102f are calculated (step S103). Next, three-phase voltage signals PWMH (Hu, Hv, Hw) and PWML (Lu, Lv, Lw) are generated based on the duty cycles PWMH_D and PWML_D, and the inverters 102 are operated by driving the gates of the power semiconductor elements 102a to 102f to drive the motor 101 (step S104). Next, the total loss SLOSS of the power semiconductor devices 102a to 102f is calculated based on the d-axis current instruction value I ds, the q-axis current instruction value Iqs, the inverter efficiency value Eff, the d-axis voltage instruction value Vds, and the q-axis voltage instruction value Vqs in step S105. Then, the temperatures TSa to TSf of the power semiconductor elements 102a to 102f are calculated based on the total losses SLOSS, the duty cycles PWMH_D, PWML_D, the thermal resistances Rth, and the measured temperature values TP (step S106).

Figure 7:
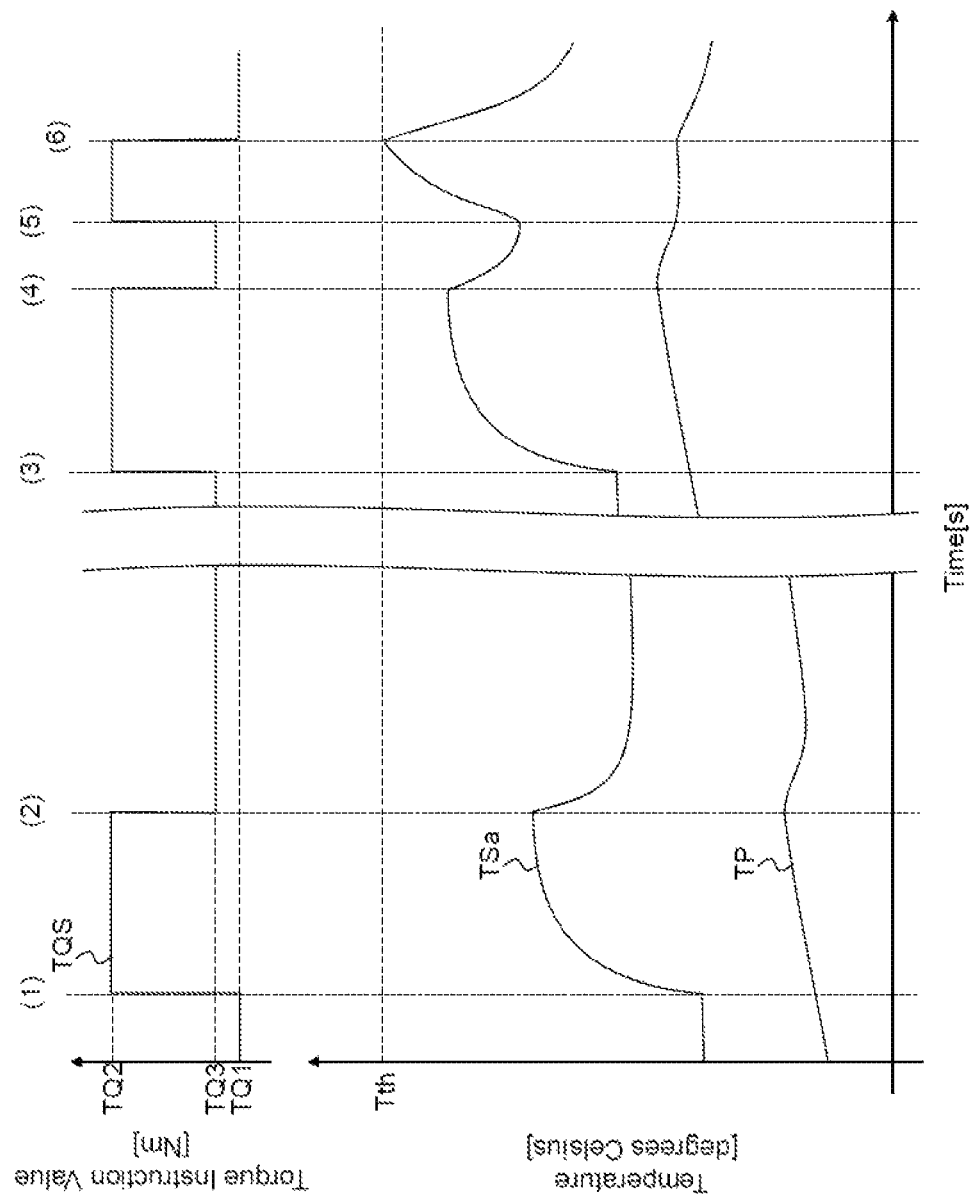
FIG. 7 is a timing chart schematically showing an example of the operation of the electronic control circuit according to the first embodiment.

An operation example of the electronic control circuit 110 according to the present embodiment will be described with reference to FIG. 7 in association with an operation example of the drive system 100. FIG. 7 is a timing chart schematically showing an example of the operation of the electronic control circuit 110 according to the first embodiment. First, in the state (1), the accelerator pedal 106 is depressed, and the driving system 100 enters an accelerating state in which the motor 101 is driven by the torque TQ2 from a state in which the motor 101 is not driven by the torque TQ1. During the driving of the motor, the water temperature TP and the temperature TSa of the power semiconductor element 102a rise. Next, in state (2), the amount of push of the accelerator 106 is reduced, and the drive system 100 becomes a cruise state that drives the motor 101 based on a reduced torque TQ3. Although the water temperature TP and the temperature TSa of the power semiconductor element 102a decrease as compared with immediately before the state (2), the driving of the motor 101 continues, so that the temperature TSa gradually increases. Subsequently, in the state (3) and the state (4), the motor 101 is driven by the torque instruction values TQ2 and TQ3 similar to those in the state (1) and the state (2), respectively, but the water temperature TP and the temperature TSa of the power semiconductor element 102a are increased because the motor 101 continues to be driven until immediately before in the state (2). Subsequently, in the state (5), the accelerator 106 is depressed again, the driving system 100 is in an accelerated state in which the motor 101 is driven by the torque TQ2, and the water temperature TP and the temperature TSa of the power semiconductor element 102a start to further increase. Next, in the state (6), the protection circuit 110_8 detects that the temperature TSa of the power semiconductor element 102a exceeds the overheat temperature threshold Tth, and outputs the abnormal signal ABN. The torque instruction value determination circuit 110_1 receives the abnormal signal ABN and sets the torque instruction value to TQ1, so that the drive system 100 does not drive the motor 101 in the torque TQ1. Thus, when the temperature TSa of the power semiconductor element 102a reaches the overheat temperature threshold Tth, the driving of the motor 101 is stopped, and the power semiconductor element 102a in the overheated state can be cooled.

The main effects of the present embodiment are as follows. The driving system 100 according to the present embodiment includes a temperature estimation circuit 110_7. The temperature estimation circuit 110_7 acquires the efficiency value Eff of the inverter corresponding to the torque instruction value TQS, and calculates the ILOSS of losses of the entire inverter based on the efficiency value Eff. Subsequently, the temperature estimation circuit 110_7 performs calculation for distributing the breakdown of the loss ILOSS of the entire inverter to each of the power semiconductor elements 102a to 102f constituting the inverter 102 based on the duty cycles PWMH_D and PWML_D for driving each of the power semiconductor elements, thereby obtaining the loss SLOSSa to SLOSSf of each of the power semiconductor elements 102a to 102f. Then, the temperature estimation circuit 110_7 calculates the temperatures TSa to TSf of the power semiconductor elements by calculation based on the loss of each power semiconductor element and the known thermal resistance value.

With such a configuration, the temperatures TSa to TSf of the power semiconductor elements 102a to 102f can be estimated at high speed and with high accuracy by calculating the SLOSSa to SLOSSf of losses of the power semiconductor elements based on the power efficiencies Eff of the inverters 102.

When it is determined that the temperature of any of the power semiconductor elements is in the overheated state, the driving of the motor 101 is stopped by the function of the protection circuit 110_8, and the power semiconductor element in the overheated state is cooled, so that the driving system 100 can prevent a failure or ignition.

In the case of a vehicle equipped with an autonomous driving system, the autonomous driving system can generate the accelerator instruction value (factor) As and the torque instruction value (factor) TQS and output them to the control device 103 regardless of the state of the accelerator pedal 106.

(Example of Configuration of Torque Map)

FIG. 8 shows a torque map under the condition of the rotational speed REV=950 [rpm] and the motor drive voltage VBUS=300 [V]. In the torque map, the d-axis current Id, the q-axis current Iq, and the efficiencies (Efficiency) corresponding to the torque (Torque) are recorded. For example, when the torque instruction value TQS is 54.0 [Nm], the corresponding d-axis current instruction value Ids is −29.62 [A], the q-axis current instruction value Iqs is 81.38 [A], and the efficiency value Eff of the inverters is 93.6[%].

The semiconductor memory 110_6 stores torque maps 110_5 of a plurality of patterns corresponding to combinations of other rotational speeds REV and motor driving voltages VBUS. When the rotational speed REV and the motor driving voltage VBUS change, the torque map 110_5 is appropriately changed to a corresponding value.

When the rotational speed REV and the motor driving voltage VBUS do not correspond to any of the torque maps 110_5, the vector instructing circuit 110_2 can adopt a value closest to the value existing in the torque maps 110_5 of the plurality of patterns. Further, by using an interpolation method such as linear interpolation or polynomial interpolation, the corresponding torque instruction value, d-axis current instruction value Ids, q-axis current instruction value Iqs, and inverter efficiency value Eff can be calculated.

The vector instruction circuit 110_2 outputs the d-axis current instruction value Ids and the q-axis current instruction value Iqs as current values to be flowed to the motor 101 in order for the motor 101 to output a desired torque, using the torque instruction value TQS and the torque map 110_5 input from the torque instruction value determination circuit 110_1.

If the torque instruction value TQS is a numerical value not present in the torque map 110_5, the vector instruction circuit 110_2 may employ the closest value based on the value present in the torque map 110_5. As another method, by using an interpolation method such as linear interpolation or polynomial interpolation, the d-axis current instruction value I ds, the q-axis current instruction value Iq S, and the efficiencies Eff of the inverters corresponding to the torque instruction values can be calculated.

Further, the drive system 100 according to the present embodiment can estimate the temperatures TSa to TSf of the power semiconductor elements 102a to 102f when the motor 101 is powered, that is, when the torque instruction value TQS is positive, and also when the motor 101 is regenerated, that is, when the torque instruction value TQS is negative.

(Configuration Example of the Gate Drive Circuit 111)

Figure 9:
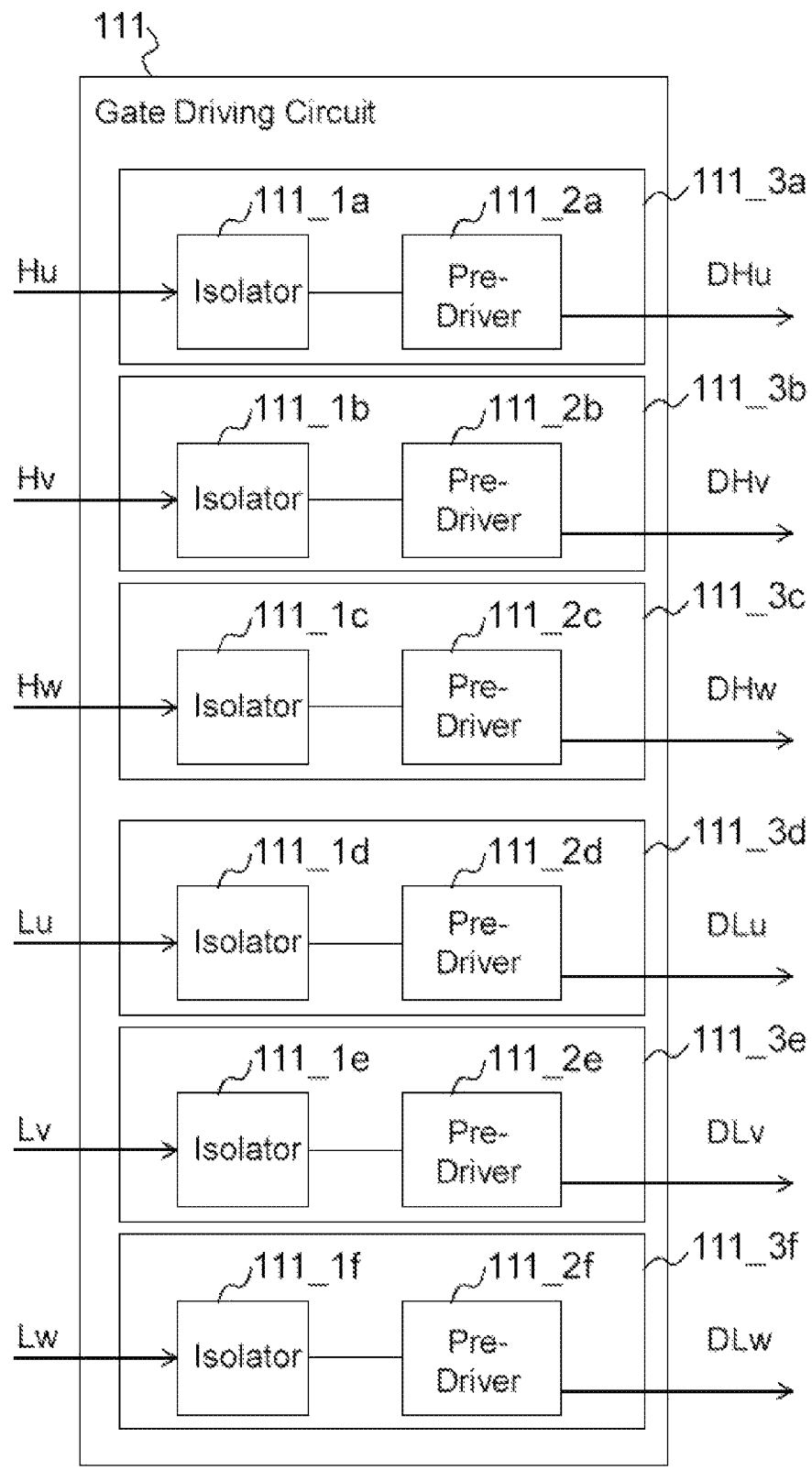
FIG. 9 is a block diagram showing a configuration example of the gate driving circuit according to the first embodiment.

FIG. 9 shows a configuration example of the gate driving circuit 111 according to the first embodiment. The gate driving circuit 111 is provided between the electronic control circuit 110 and the inverter 102. The gate driving circuit 111 includes isolators 111_1a to 111_1f for transmitting and receiving signals by magnetic coupling while electrically isolating the inverter 102 and the control device 103, and pre-drivers 111_2a to 111_2f for driving the gates of the power semiconductor devices 102a to 102f.

The pre-drivers 111_2a to 111_2f output gate drive signals DPWMH (DHu, DHv, DHw) and DPWML (DLu, DLv, DLw) for controlling the gates of the corresponding power semiconductor elements (102a, 102c, 102e) and (102b, 102d, 102f), respectively, based on complementary three-phase voltage signals PWMH (Hu, Hv, Hw) and PWML (Lu, Lv, Lw).

Since the gate driving circuit 111 has a function of insulating the electronic control circuit 110 formed of a low-voltage device such as an MCU and the inverter 102 formed of a power device, it is preferable that the gate driving circuit 111 be formed of a semiconductor device independent of the electronic control circuit 110 and the inverter 102. In the gate driving circuit 111 according to the first embodiment, one pair of the isolators 111_1a to 111_1f and one pair of the pre-drivers 111_2a to 111_2f are mounted in each of the driving semiconductor devices 111_3a to 111_3f.

(Configuration Examples of Power Semiconductor Elements 102a to 102f)

Figure 10:
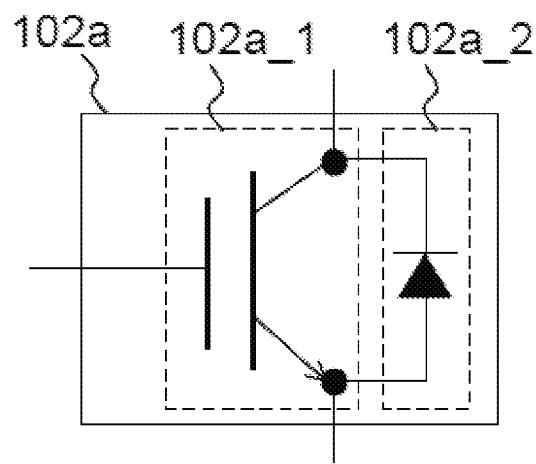
FIG. 10 is a block diagram showing a configuration example of the power semiconductor device according to the first embodiment.

FIG. 10 shows a configuration example of the power semiconductor element 102a. The power semiconductors 102b to 102f have the same configuration as that of the power semiconductor element 102a shown in FIG. 10. The power semiconductor 102a includes an insulated gate bipolar transistor (IGBT) 102a_1 and a fast recovery diode (FRD) 102a_2. When a current flows through the IGBT 102a_1, the IGBT 102a_1 generates heat. When a current flows through the FRD 102a_2, the FRD 102a_2 generates heat.

That is, while the heat generation of the IGBT 102a_1 depends on the duty cycle Hu_D of the voltage signal Hu, the heat generation of the FRD 102a_2 depends on (1−Hu_D) of the voltage signal Hu. Therefore, the loss SLOSS FRD of the FRD 102a_2 can be estimated by using (1−Hu_D) instead of using the duty cycle Hu_D to estimate the temperature. In addition, if the thermal resistance Rth_FRD of the FRD 102 a_2 is known, the junction temperature TSa_FRD of the FRD 102a_2 can also be estimated. By applying the above-described temperature estimation method of the FRD 102a_2 to the FRDs 102b_2 to 102f_2 of the power semiconductors 102b to 102f, the temperatures TS FRD (TSa_FRD, TSb_FRD, TSc_FRD, TSd_FRD, TSe_FRD, TSf_FRD) of the six FRDs 102a_2 to 102f_2 can be estimated.

Modification of Embodiment 1

Figure 11:
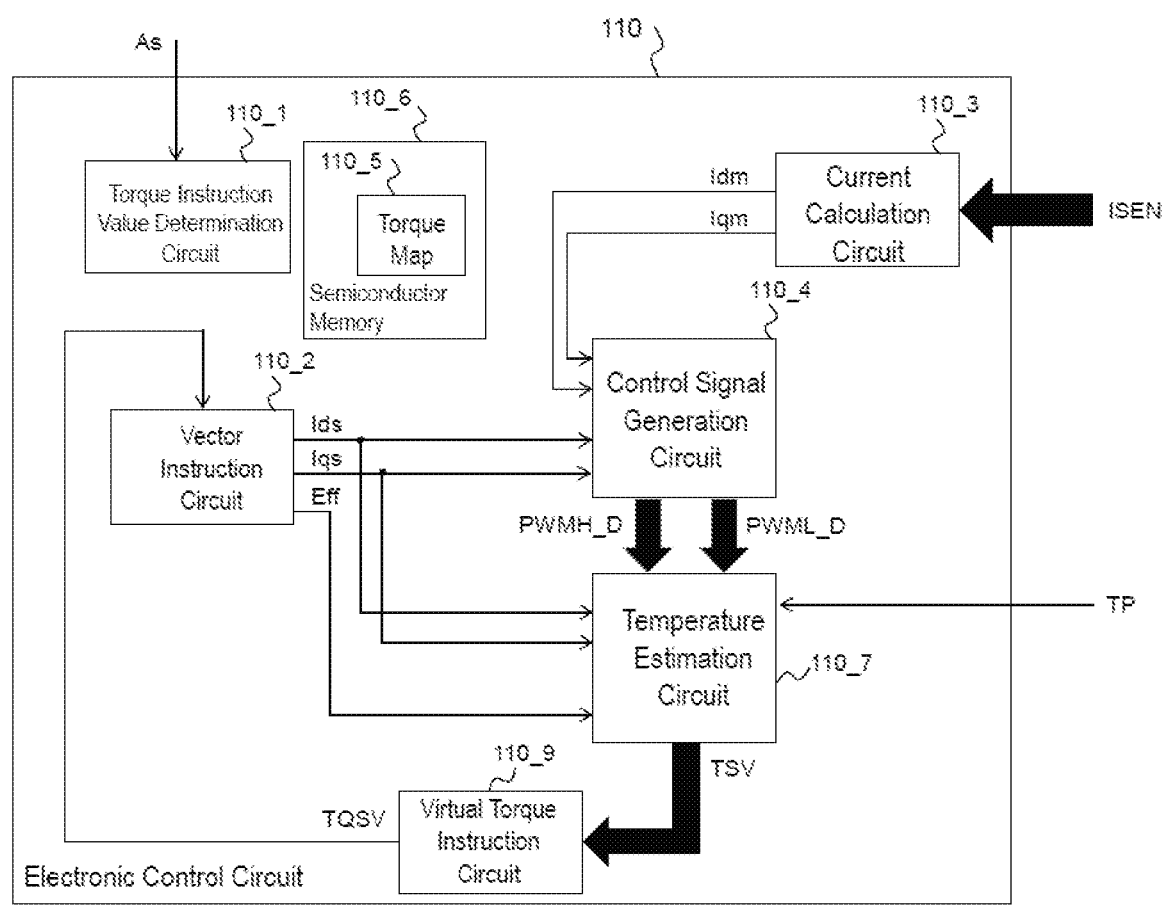
FIG. 11 is a block diagram showing a configuration example in a modification of the electronic control circuit according to the first embodiment.

FIG. 11 is a configuration example of a temperature estimation mode in a modification of the electronic control circuit 110 according to the first embodiment. In comparison, the electronic control circuit 110 of FIG. 5 is a configuration example of a normal operation mode. That is, since the function of the electronic control circuit 110 is implemented by a program using a processor, it is possible to change the components and their connection relationships in accordance with a change in the operation mode.

In the present modification, when any of the temperatures TSa to TSf of the power semiconductor elements 102a to 102f exceeds the overheat temperature threshold Tth, the electronic control circuit 110 temporarily assumes the configuration of the temperature estimation mode shown in FIG. 11. In the electronic control circuit 110 having the configuration of FIG. 11, the vector instruction circuit 110_2 inputs the virtual (preliminary, pseudo) torque value TQSV generated by the virtual torque instruction circuit 110_9 instead of the torque instruction value TQS. The virtual torques TQSV are independent of the signals driving the inverters 102.

The electronic control circuit 110 assumes that the inverters 102 are driven by the virtual torques TQSV, and estimates the virtual temperatures TSV (TSVa, TSVb, TSVc, TSVd, TSVe, TSVf) of the power semiconductor elements 102a to 102f by the temperature estimation circuit 110_7 in the same manner as in the first embodiment. On the other hand, signals generated based on the virtual torques TQSV are not outputted to the gate driver 111.

The electronic control circuit 110 sets, for example, a value of ½ of the torque instruction value TQS as the virtual torque value TQSV, and when the virtual temperature TSVa to TSVf does not exceed the overheat temperature threshold Tth, transmits the virtual torque value TQSV to the torque instruction value determination circuit 110_1 as an allowable torque within an operation range in which overheating is avoided. The torque instruction value determination circuit 110_1 employs the value of the virtual torque instruction value TQSV as the torque instruction value TQS, not based on the accelerator instruction value As. Thereafter, the electronic control circuit 110 returns to the normal mode shown in FIG. 5, and performs the drive control described in the first embodiment.

If the virtual temperature TSVa to TSVf exceeds the overheat temperature threshold Tth even if the value of ½ of the torque instruction value TQS is used as the virtual torque value TQSV, the virtual torque value TQSV is gradually decreased to a value of ⅓ and a value of ¼ of the torque instruction value TQS, and the virtual temperature TSVa to TSVf based on these values is sequentially calculated. Then, the virtual torque value TQSV at the time point when the virtual temperature TSVa to TSVf not exceeding the overheat temperature threshold Tth is obtained is adopted as the value of the torque instruction value TQS.

The effects peculiar to the present modification are as follows. That is, even when any of the temperatures TSa to TSf of the power semiconductor elements 102a to 102f exceeds the overheat temperature threshold Tth, the electronic control circuit 110 can perform control so as to maintain driving of the inverter 102 while preventing overheating and allow the vehicle to continue running.

Embodiment 2

Figure 12:
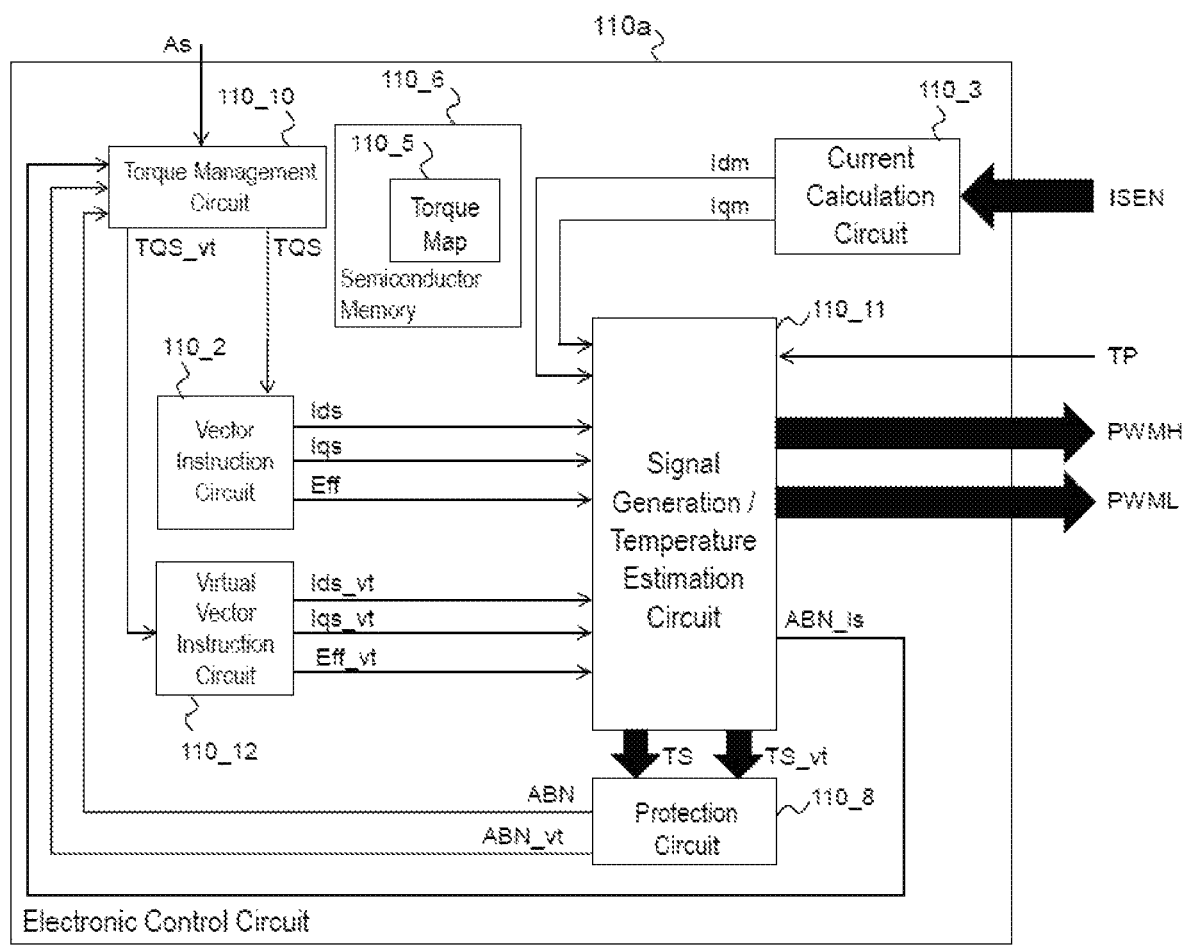
FIG. 12 is a block diagram showing an example of the configuration of the electronic control circuit according to the second embodiment.

Next, Embodiment 2 will be described. In the second embodiment, an electronic control circuit 110a which is another form of the electronic control circuit 110 according to the first embodiment will be described. FIG. 12 is a diagram showing an example of the configuration of the electronic control circuit 110a according to the second embodiment. In Embodiment 2, configurations other than the electronic control circuit 110a may be the same as those in Embodiment 1. The description of Embodiment 1 applies mutatis mutandis to the internal configuration of the electronic control circuit 110a that is given the same reference numerals as those of Embodiment 1.

As shown in FIG. 12, in the electronic control circuit 110a according to the second embodiment, a torque management circuit 110_10, a signal generation/temperature estimation circuit 110_11, a virtual vector instruction circuit 110_12, and a temperature management circuit 110_13 are added as compared with the electronic control circuit 110 according to Embodiment 1. The torque instruction value determination circuit 110_1, the control signal generation circuit 110_4, the temperature estimation circuit 110_7, and the protection circuit 110_8 are removed.

The torque management circuit 110_10 calculates a torque instruction value TQS indicating the torque to be output by the motor 101 based on the accelerator instruction value As, and outputs the torque instruction value TQS to the vector instruction circuit 110_2.

Further, the torque management circuit 110_10 calculates a virtual torque value TQS_vt on the assumption that the inverter 102 is driven with an arbitrary torque, and outputs the calculated value to the virtual vector instruction circuit 110_12.

Based on the torque instruction value TQS inputted from the torque instruction value determination circuit 110_1, the vector instruction circuit 110_2 outputs the d-axis current instruction value Ids, the q-axis current instruction value Iqs, and the inverter efficiency value Eff when the motor 101 is driven under these current conditions to the signal generation/temperature estimation circuit 110_11.

The virtual vector instruction circuit 110_2 outputs the virtual d-axis current instruction value Ids_vt, the virtual q-axis current instruction value Iqs_vt, and the virtual inverter efficiency value Eff_vt when the motor 101 is driven under these current conditions to the signal generation/temperature estimation circuit 110_11 based on the virtual torque instruction value TQS_vt inputted from the torque instruction value determination circuit 110_1.

The signal generation/temperature estimation circuit 110_11 includes functions of the control signal generation circuit 110_4 and the temperature estimation circuit 110_7 according to the first embodiment. That is, complementary three-phase voltage signals PWMH (Hu, Hv, Hw) and PWML (Lu, Lv, Lw) are generated based on the d-axis current measurement value Id m and the q-axis current measurement value Iqm and the d-axis current measurement value Ids and the q-axis current measurement value Iqs in the same manner as in the first embodiment. Further, based on the duty cycles of the complementary three-phase voltage signals PWMH_D (Hu_D, Hv_D, Hw_D), PWML_D (Lu_D, Lv_D, Lw_D), the d-axis current instruction value Ids, the q-axis current instruction value Iqs, the d-axis voltage instruction value Vds, the q-axis voltage instruction value Vqs, the temperature measurement value TP, and the inverters efficiencies Eff, the temperatures TS (TSa, TSb, TSc, TSd, TSe, TSf) of the power semiconductors 102a to 102f are estimated.

The signal generating/temperature estimating circuit 110_11 estimates virtual temperatures TS_vt (TSa_vt, TSb_vt, TSc_vt, TSd_vt, TSe_vt, TSf_vt) of the power semiconductor devices 102a to 102f based on the d-axis current measurement value Idm, the q-axis current measurement value Iqm, the virtual d-axis current measurement value Ids_vt, the virtual q-axis current measurement value Iqs_vt, the temperature measurement value TP, and the virtual inverter efficiency value Eff_vt.

The temperature management circuit 110_13 includes the function of the protection circuit 110_8 according to the first embodiment. That is, the temperature management circuit 110_13 holds the overheat temperature threshold Tth, and when any of TSa to TSf exceeds Tth, outputs an abnormal signal ABN indicating that the inverter 102 is in an overheated state to the torque management circuit 110_10. When the abnormal signal ABN is received, the torque management circuit 110_10 outputs a zero value as the torque instruction value TQS in order to stop driving the motor 101. Specifically, the torque map 110_5 is referred to, and the current instruction values Ids=0 [A] and Iqs=0 [A] of TQS=0 [Nm] are outputted. As a result, no current flows through all of the power semiconductor elements 102a to 102f, and the power semiconductor elements in the overheated state are cooled.

Further, when any of TSa_vt to TSf_vt exceeds Tth, the temperature management circuit 110_13 outputs a virtual abnormality signal ABN_vt indicating that the inverter 102 is in an overheated state to the torque management circuit 110_10 when it is assumed that the motor 101 is driven by the virtual torque instruction value TQS_vt. When receiving the abnormal signal ABN_vt, the torque management circuit 110_10 controls the torque management circuit 110_10 so as not to output a value exceeding the virtual torque instruction value TQS_vt as the torque instruction value TQS.

Specifically, the torque management circuit 110_10 includes a limiting circuit 110_10_1. The limiting circuit 110_10_1 compares the torque instruction value TQS with the torque limit value TQS_limit, and outputs the torque limit value TQS_limit as the torque instruction value TQS when the torque instruction value TQS exceeds the torque limit value TQS_limit. When the virtual torque instruction value TQS_vt is set as the torque limit value TQS_limit, the torque management circuit 110_10 does not output the torque instruction value TQS exceeding the virtual torque instruction value TQS_vt regardless of the value of the accelerator instruction value As.

When the virtual error signal ABN_vt is received in response to the output of the optional virtual torque instruction value TQS_vt, the torque management circuit 110_10 outputs the virtual torque instruction value TQS_vt gradually decreasing. Then, the virtual torque instruction value TQS_vt at the time when the virtual abnormality signal ABN_vt is no longer output is adopted as the torque limit value TQS_limit.

When the virtual abnormality signal ABN_vt is not received in response to the output of the arbitrary virtual torque instruction value TQS_vt, the torque management circuit 110_10 sequentially outputs the virtual torque instruction value TQS_vt while gradually increasing the virtual torque instruction value TQS_vt. Then, the virtual torque instruction value TQS_vt at the time when the virtual abnormality signal ABN_vt is output is adopted as the torque limit value TQS_limit.

In addition, the signal generation/temperature estimation circuit 110_11 has a function of calculating an allowable inverter loss ILOSS_max in which the inverter 101 is not overheated. An arithmetic expression for calculating the allowable inverter loss ILOSS_max is represented by the following equation (8).

[Equation 8]

$$ILOSS\_max = (T_{th} - TP)/(Rth \times Ch) + OLOSS \quad (8)$$

The signal generating/temperature estimating circuit 110_11 calculates the loss ILOSS of the inverter 102 in the same manner as in the first embodiment, based on the d-axis current instruction value Ids and the q-axis current instruction value Iqs inputted from the vector instruction circuit 110_2, and the inverter efficiency value Eff when the motor 101 is driven under these current conditions. Then, the inverter loss ILOSS is compared with the allowable inverter loss ILOSS_max, and when the inverter loss ILOSS exceeds the allowable inverter loss ILOSS_max, an abnormal signal ABN_ls indicating that the torque instruction value TQS is a numerical value that causes a loss enough for the inverter 102 to become overheated is outputted to the torque managing circuit 110_10. When the abnormality signal ABN_ls is input, the torque management circuit 110_10 performs stop control of motor driving and control of torque limitation in the same manner as when the abnormality signal ABN or the abnormality signal ABN_vt is input.

The main effects of the present embodiment are as follows. The electronic control circuit 110a can estimate the virtual temperatures TS_vt (TSa_vt, TSb_vt, TSc_vt, TSe_vt, TSf_vt) of the power semiconductor elements 102a to 102f under the virtual driving conditions while estimating the temperatures TS (TSa, TSb, TSc, TSd, TSe, TSf) of the power semiconductor elements 102a to 102f under the conditions driving the inverter 102. In addition, the maximum allowable inverter loss ILOSS_max at which the inverter 102 does not become overheated can be calculated, notified to the torque management circuit 110_10, and the output torque can be limited in the torque management circuit 110_10.

The limitation of the output torque in the torque management circuit 110_10 can be implemented in combination with other conditions and elements in the vehicle or the drive system 100. For example, the torque limit value TQS_limit may be set according to the remaining amount of the battery 108.

Embodiment 3

Figure 13:
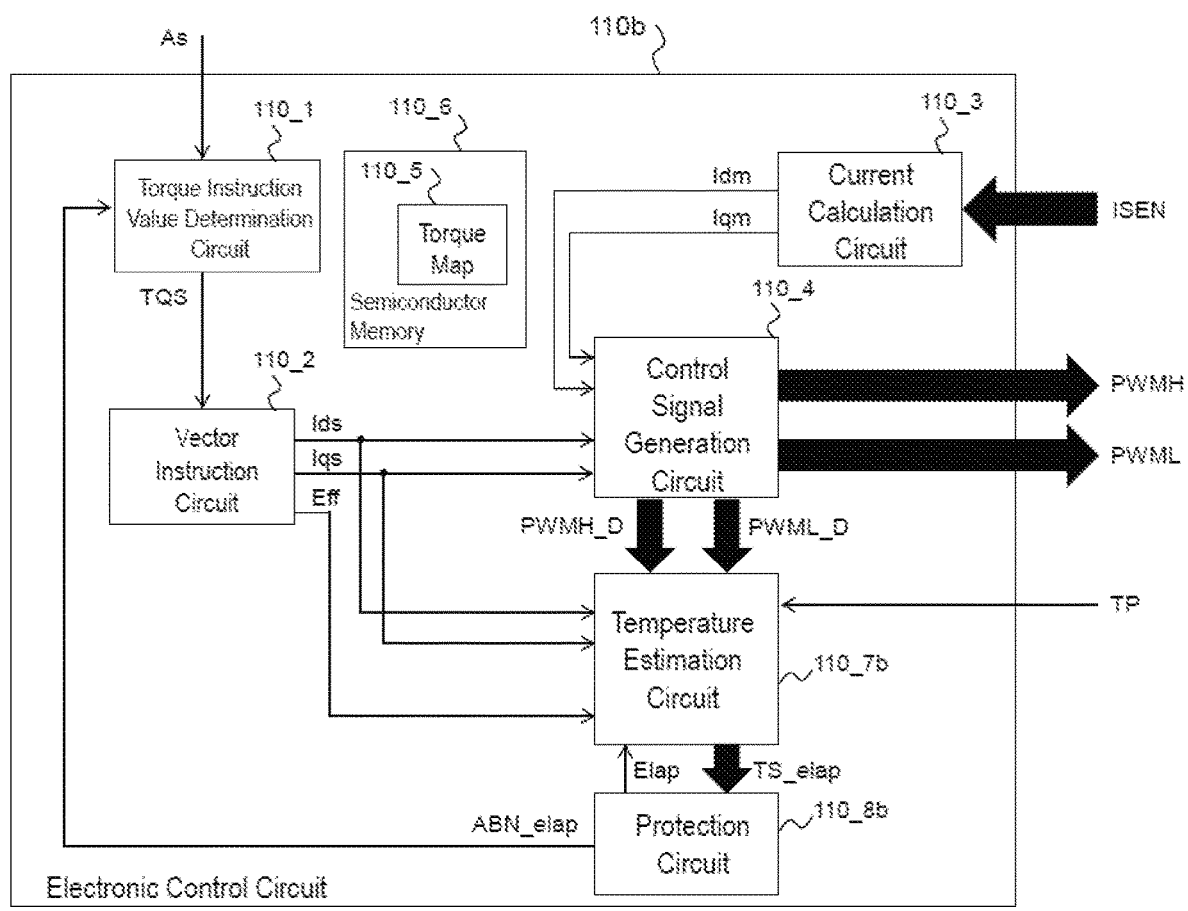
FIG. 13 is a block diagram showing an example of the configuration of the electronic control circuit according to the third embodiment.

Next, Embodiment 3 will be described. In Embodiment 3, an electronic control circuit 110b which is another form of the electronic control circuit 110 according to Embodiment 1 will be described. FIG. 13 is a diagram showing an example of the configuration of the electronic control device 110b according to the third embodiment. In Embodiment 3, configurations other than the electronic control circuit 110b may be the same as those in Embodiment 1. The description of Embodiment 1 applies mutatis mutandis to the internal configuration of the electronic control circuit 110b that is given the same reference numerals as those of Embodiment 1.

As shown in FIG. 13, the electronic control circuit 110b according to the third embodiment includes a temperature estimation circuit 110_7b instead of the temperature estimation circuit 110_7, and a protection circuit 110_8b instead of the protection circuit 110_8, as compared with the electronic control circuit 110 according to the first embodiment.

The temperature estimation circuit 110_7b according to the present embodiment has a function of estimating the temperature of the power semiconductor elements 102a to 102f after an arbitrary time has elapsed after driving the motor 101 with the torque instruction value TQS. The temperature estimation circuit 110_7b inputs the elapsed time Elap serving as a temperature estimation reference from the protective circuit 110_8b. Then, temperatures TS_elap (TSa_elap, TSb_elap, TSc_elap, TSd_elap, TSe_elap, TSf_elap) of the power semiconductor elements 102a to 102f when the elapsed time Elap has elapsed are estimated and outputted to the protective circuit 110_8b. Hereinafter, a specific configuration example for realizing the temperature estimation will be described.

The protective circuit 110_8b outputs the elapsed time Elap to the temperature estimation circuit 110_7b in order to obtain the estimated temperature values TSa_elap to TSf_elap of the power semiconductor elements 102a to 102f when the elapsed time Elap has elapsed since the motor 101 was continuously driven by the torque TQS.

While the temperature estimation circuit 110_7 according to the first embodiment uses the thermal resistance Rth for temperature estimation, the temperature estimation circuit 110_7b according to the third embodiment uses the transient thermal resistance Rth_trans for temperature estimation. The transient thermal resistance Rth_trans is a change in thermal resistance with heat generation time, and in the present embodiment, the transient thermal resistance for calculating the temperature of the junction portion of the power semiconductor elements 102a to 102f is equally Rth_trans.

Figure 14:
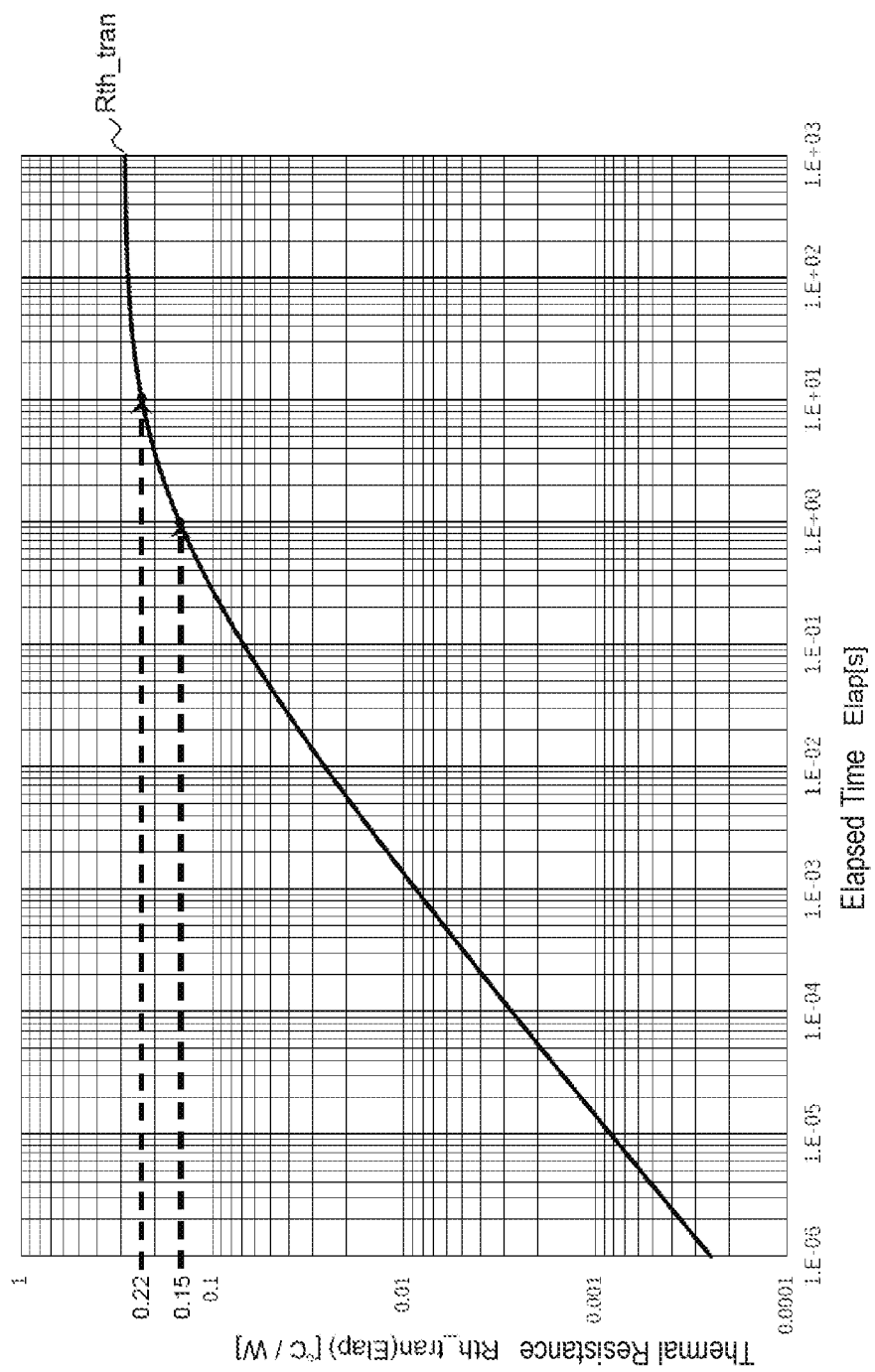
FIG. 14 is a graph showing an example of the transient thermal resistance.

FIG. 14 shows an example of the transient thermal resistance Rth_trans. The abscissa represents the heat generation time [s], and the ordinate represents the thermal resistance [degrees Celsius per watt]. Here, if the thermal resistance at the elapsed time Elap is described as Rth_trans (Elap), the thermal resistance Rth_trans (Elap) at the time when the heat generation continues for 1 second, that is, at Elap=1(1.0E+00) is about 0.15 [degrees Celsius per watt], and the thermal resistance Rth_trans (Elap) at the time when the heat generation continues for 10 seconds, that is, at Elap=10(1.0E+0.1) is about 0.22 [degrees Celsius per watt Based on the inputted elapsed time Elap, the temperature estimation circuit 110_7b calculates the thermal resistance Rth-trans (Elap) when the elapsed time Elap elapses after the motor 101 continues to be driven by the torque instruction value TQS.

The temperature estimation circuit 110_7 obtains the temperature TS_elap (TSa_elap, TSb_elap, TSc_elap, TSd_elap, TSe_elap, TSf_elap) of the power semiconductor elements 102a to 102f at a point in time when the elapsed time Elap has elapsed after driving the motor 101 with the torque instruction value TQS by the following equation (9).

[Equation 9]

$$\begin{pmatrix} TS_a\_elap \\ TS_b\_elap \\ TS_c\_elap \\ TS_d\_elap \\ TS_e\_elap \\ TS_f\_elap \end{pmatrix} = \text{Rth\_tran}(Elap) \times \begin{pmatrix} SLOSS_a \\ SLOSS_b \\ SLOSS_c \\ SLOSS_d \\ SLOSS_e \\ SLOSS_f \end{pmatrix} + TP \quad (9)$$

The transient thermal resistance Rth_trans of the power semiconductor elements 102a to 102f is known by measurement or simulation, and the value is held in the electronic control circuit 110b. As a holding method, for example, the data can be stored in the semiconductor memory 110_6. The transient thermal resistance Rth_trans of the power semiconductor elements 102a to 102f can also be calculated in the electronic control circuit 110b.

Further, in the calculation of the present embodiment, the transient thermal resistances of the power semiconductor elements 102a to 102f are equal to Rth_trans, but by acquiring the individual transient thermal resistances Rtha_trans to Rthf_trans of the power semiconductor elements 102a to 102f in advance, the calculation can be performed in consideration of the difference in the transient thermal resistances of the power semiconductor elements 102a to 102f caused by the condition for mounting the power semiconductor elements 102a to 102f on the drive system 100. When the temperatures TSa_elap to TSf_elap of the power semiconductor elements 102a to 102f when the elapsed time Elap elapses are calculated using the individual thermal resistances Rtha_trans to Rthf_trans, an arithmetic expression represented by the following expression (10) is used.

[Equation 10]

$$\begin{pmatrix} TS_a\_elap \\ TS_b\_elap \\ TS_c\_elap \\ TS_d\_elap \\ TS_e\_elap \\ TS_f\_elap \end{pmatrix} = \begin{pmatrix} Rth_a\_tran(Elap) \times SLOSS_a \\ Rth_b\_tran(Elap) \times SLOSS_b \\ Rth_c\_tran(Elap) \times SLOSS_c \\ Rth_d\_tran(Elap) \times SLOSS_d \\ Rth_e\_tran(Elap) \times SLOSS_e \\ Rth_f\_tran(Elap) \times SLOSS_f \end{pmatrix} + TP \quad (10)$$

The protective circuit 110_8b inputs the temperatures TSa_elap to TSf_elap of the power semiconductor elements 102a to 102f when an elapsed time Elap has elapsed since the motor 101 was continuously driven by the torque TQS. The protection circuit 110_8b compares each of the temperatures TSa_elap to TSf_elap with the overheat temperature threshold Tth. When any one of the temperatures TSa_elap to TSf_elap exceeds Tth, the protecting circuit 110_8 outputs an abnormal signal ABN_elap indicating that the inverter 102 is in an overheated state when the elapsed time Elap elapses under the present driving condition, to the torque instruction value determining circuit 110_1. The torque instruction value determination circuit 110_1 stops driving the motor 101 when an abnormal signal ABN_elap is received. In addition, the output torque can be limited by the same configuration and method as those of the limiting circuit 110_10_1 of the second embodiment without stopping the driving of the motor 101.

Figure 15:
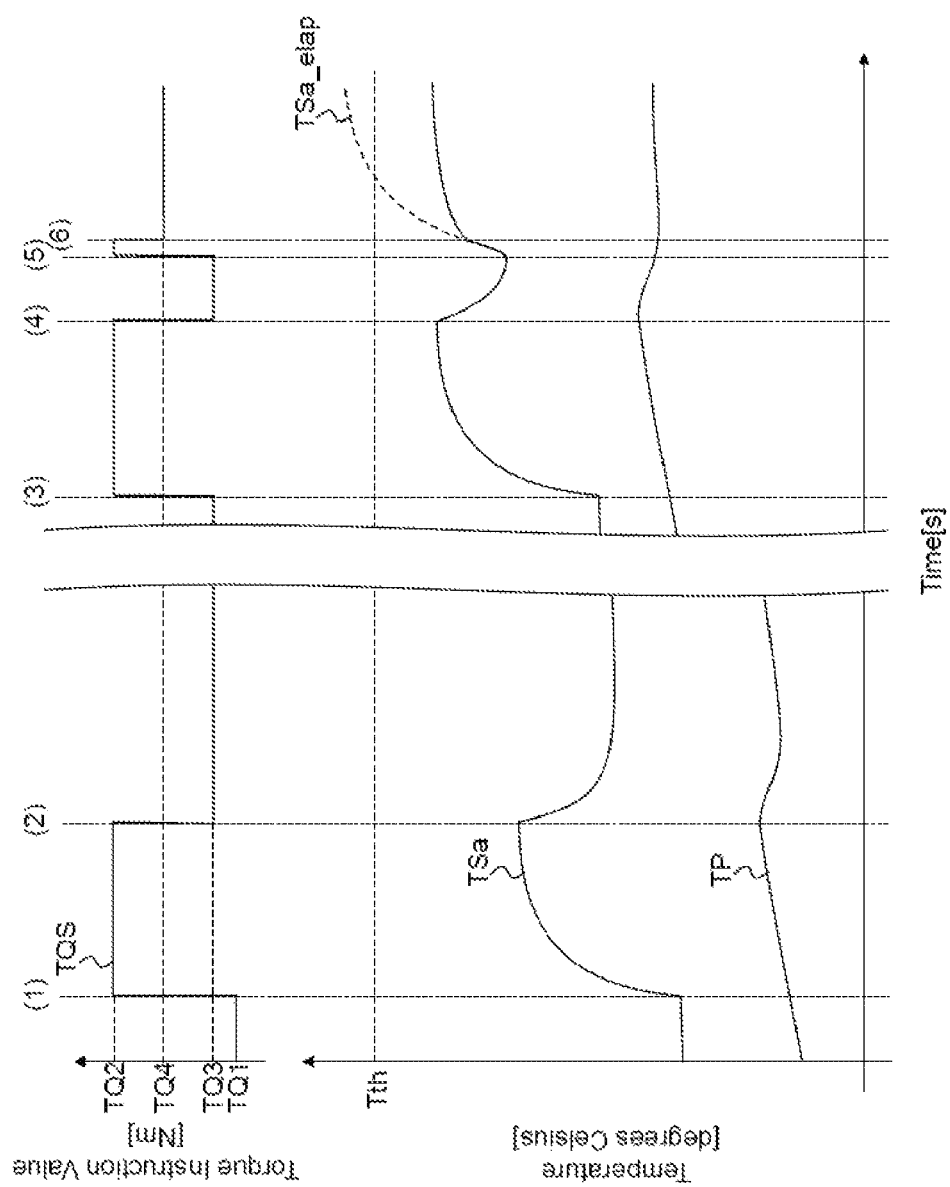
FIG. 15 is a timing chart showing an example of the operation of the electronic control circuit according to the third embodiment.

An operation example of the electronic control circuit 110b according to the present embodiment will be described with reference to FIG. 15 in association with an operation example of the drive system 100. FIG. 15 is a timing chart schematically showing an example of the operation of the electronic control circuit 110b according to the third embodiment. The description from the state (1) to the state (5) is the same as the description of FIG. 7 related to the first embodiment. Next, in the state (6), the protective circuit 110_8b detects that the temperature TSa_elap of the power semiconductor element 102a when the elapsed time Elap elapses exceeds the overheat temperature threshold Tth, and outputs the abnormal signal ABN_elap. The torque instruction value determination circuit 110_1 that has received the abnormal signal ABN_elap switches the torque instruction value from TQ2 to TQ4 by controlling the output torque to limit the output torque. This can prevent overheating of the power semiconductor element 102a before the temperature TSa of the power semiconductor element 102a reaches the overheat temperature threshold Tth.

The main effects of the present embodiment are as follows. The driving system 100 according to the present embodiment can estimate the temperatures TSa_elap to TSf_elap of the power semiconductor elements 102a to 102f when the elapsed time Elap has elapsed since the motor 101 is continuously driven by the torque TQS by using the transient thermal resistance Rth_trans of the power semiconductor elements for the temperature estimation.

According to this configuration, since the control based on the prediction of the future can be performed, the protection operation can be performed before the inverter 102 reaches the overheated state. Therefore, the drive system 100 can perform control for preventing a failure or ignition based on an arbitrary safety margin.

Although the invention made by the inventor has been specifically described based on the embodiment, the present invention is not limited to the embodiment already described, and it is needless to say that various modifications can be made without departing from the gist thereof.

What is claimed is:

1. A control circuit comprising:
   a calculation circuit configured to generate a current vector and an efficiency value based on a drive instruction value;
   a signal generation circuit configured to generate a driving signal corresponding to a power semiconductor device based on the drive instruction value; and
   a temperature estimation circuit configured to estimate, while the signal generation circuit outputs the driving signal generated based on the drive instruction value to the power semiconductor device, a temperature of the power semiconductor device based on the current vector and the efficiency value; and
   a protection circuit configured to generate, in response to the estimated temperature of the power semiconductor device exceeding a threshold temperature and while the signal generation circuit outputs the driving signal generated based on the drive instruction value to the power semiconductor device, a pseudo driving instruction value being smaller than the driving instruction value,
   wherein, in response to the pseudo driving instruction value being generated:
      the calculation circuit determines, based on the pseudo drive instruction value, a pseudo current vector and a pseudo efficiency value;
      the temperature estimation circuit estimates, based on the pseudo current vector and the pseudo efficiency value, a pseudo temperature of the power semiconductor device;
      when the pseudo temperature does not exceed the threshold temperature, 1) the drive instruction value is updated with the pseudo drive instruction value, and 2) the signal generation circuit generates the driving signal corresponding to the power semiconductor device based on the updated drive instruction value; and
      when the pseudo temperature exceeds the threshold temperature, 1) the drive instruction value is not updated with the pseudo driving instruction value such that the signal generation circuit continues to output the driving signal generated based on the drive instruction value to the power semiconductor device, and 2) the protection circuit generates another pseudo driving instruction value being smaller than the pseudo driving instruction value.

2. The control circuit according to claim 1, wherein the efficiency value includes a ratio of an output voltage and an input voltage of the power semiconductor device.

3. The control circuit according to claim 1, further comprising a memory circuit configured to store the efficiency value.

4. The control circuit according to claim 1,
wherein the driving signal comprises a PWM signal having a first duty cycle, and
wherein the estimation of the temperature is performed based on the efficiency value and the first duty cycle.

5. The control circuit according to claim 4, wherein the calculation circuit determines the current vector corresponding the drive instruction value, and determines the first duty cycle based on the current vector.

6. The control circuit according to claim 1, further comprises a limitation circuit configured to limit the drive instruction value based on the pseudo temperature.

7. An electric driving system comprising:
an electric motor;
an inverter comprising a plurality of power semiconductor devices and configured to drive the electric motor; and
a control device configured to supply the inverter with a driving signal,
wherein the control device comprises:
a calculation circuit configured to generate an inverter current vector and an inverter efficiency value based on an inverter driving value;
a signal generation circuit configured to generate the driving signal based on the inverter driving value corresponding a driving torque for the electric motor;
a temperature estimation circuit configured to estimate, while the signal generation circuit outputs the driving signal generated based on the inverter driving value to the power semiconductor device, temperatures of the power semiconductor devices based on the inverter current vector and the inverter efficiency value; and
a protection circuit configured to generate, in response to at least one of the estimated temperatures of the power semiconductor devices exceeding a threshold temperature and while the signal generation circuit outputs the driving signal generated based on the inverter driving value to the power semiconductor devices, a pseudo inverter driving value being smaller than the inverter driving value, and wherein, in response to the pseudo inverter driving value being generated;
the calculation circuit determines, based on the pseudo inverter driving value, a pseudo inverter current vector and a pseudo inverter efficiency value;
the temperature estimation circuit estimates, based on the pseudo inverter current vector and the pseudo inverter efficiency value, pseudo temperatures of the power semiconductor devices;
when at least one of the pseudo temperatures does not exceed the threshold temperature, 1) the inverter driving value is updated with the pseudo inverter driving value, and 2) the signal generation circuit generates the driving signal based on the updated inverter driving value; and when the at least one of the pseudo temperatures exceeds the threshold temperature, 1) the inverter driving value is not updated with the pseudo inverter driving value such that the signal generation circuit continues to output the driving signal generated based on the inverter driving value to the power semiconductor devices, and 2) the protection circuit generates another pseudo inverter driving value being smaller than the pseudo inverter driving value.

8. The electric driving system according to claim 7, wherein the inverter efficiency value includes a ratio of an output voltage and an input voltage of the inverter.

9. The electric driving system according to claim 7, further comprises a store circuit configured to store the inverter driving value and the inverter efficiency value.

10. The electric driving system according to claim 7,
wherein the inverter includes a temperature sensor outputting a measured temperature value, and
wherein the temperature estimation circuit estimates the temperatures of the power semiconductor devices further based on the measured temperature value.

11. The electric driving system according to claim 7, wherein the temperature estimation circuit estimates each temperature of the power semiconductor devices based on each thermal resistance value of the power semiconductor devices.

12. The electric driving system according to claim 11,
wherein the thermal resistance value comprises a transient thermal resistance value,
wherein the estimation of each temperature of the power semiconductor devices is based on each transient thermal resistance value of the power semiconductor devices,
wherein each estimated temperature is a temperature of each of the semiconductor devices when inverter drives the electric motor for a predetermined time by the inverter driving value.

13. A method for controlling an inverter, comprising:
detecting an inverter driving value, an inverter current vector, and an inverter efficiency value which correspond to a torque instruction value;
driving, based on the inverter driving value, a plurality of power semiconductor devices included in the inverter; and
estimating, while the plurality of power semiconductor devices is being driven based on the inverter driving value, temperatures of the power semiconductor devices based on the inverter efficiency value and the inverter current vector,
wherein when at least one of the estimated temperatures of the power semiconductor devices exceeding a threshold temperature, a pseudo inverter driving value being smaller than the inverter driving value is generated while the plurality of power semiconductor devices is being driven based on the inverter driving value,
wherein, in response to the pseudo inverter driving value being generated:
a pseudo inverter current vector and a pseudo inverter efficiency value are generated based on the pseudo inverter driving value;
pseudo temperatures of the power semiconductor devices are estimated based on the pseudo inverter current vector and the pseudo inverter efficiency value;
when at least one of the pseudo temperatures does not exceed the threshold temperature, 1) the inverter driving value is updated with the pseudo inverter driving value, and 2) the plurality of power semiconductor devices is driven based on the updated inverter driving value; and when the at least one of the pseudo temperature exceeds the threshold temperature, 1) the inverter driving value is not updated with the pseudo inverter driving value such that the plurality of power semiconductor devices continues to be driven based on the inverter driving value, and 2) another pseudo inverter driving value being smaller than the pseudo inverter driving value is generated.

14. The method according to claim 13, wherein the inverter efficiency value includes a ratio of an output voltage and an input voltage of the inverter.

15. The method according to claim 13,
wherein the driving is performed by supplying each of the plurality of the power semiconductor devices with corresponding one of a plurality of driving signals respectively,
wherein each of the driving signals has an individual driving factor, and
wherein the estimation is performed by calculating each temperature of the power semiconductor devices based on the inverter efficiency value and the individual driving factor.

16. The method according to claim 15,
wherein each of the driving signals comprises a PWM signal, and
wherein the individual driving factor includes a duty cycle of the PWM signal.

\* \* \* \* \*